US006856951B2

(12) United States Patent
Moona et al.

(10) Patent No.: US 6,856,951 B2
(45) Date of Patent: Feb. 15, 2005

(54) REPARTITIONING PERFORMANCE ESTIMATION IN A HARDWARE-SOFTWARE SYSTEM

(76) Inventors: Rajat Moona, #2F, Maruthi Heights, Road No. 1, Banjara Hills, Hyderabad 500 034 (IN); Russell Alan Klein, 2075 Alpine Dr., West Linn, OR (US) 97068

(*) Notice: Subject to any disclaimer, the term of this patent is extended or adjusted under 35 U.S.C. 154(b) by 84 days.

(21) Appl. No.: 10/295,193

(22) Filed: Nov. 15, 2002

(65) Prior Publication Data

US 2004/0098242 A1 May 20, 2004

(51) Int. Cl.$^7$ ............................. G06F 9/45; G06F 9/455; G06F 17/50
(52) U.S. Cl. ............................. 703/22; 703/27; 703/14; 716/1; 716/2; 716/7; 716/17; 716/18; 717/135; 717/151
(58) Field of Search ............................. 703/2, 13, 14, 703/20, 21, 22, 27, 26; 717/135, 151; 716/1, 2, 3, 7, 17, 18

(56) References Cited

U.S. PATENT DOCUMENTS

| | | | |
|---|---|---|---|
| 5,493,672 A | | 2/1996 | Lau et al. |
| 5,598,344 A | | 1/1997 | Dangelo et al. |
| 5,815,206 A | * | 9/1998 | Malladi et al. ............. 704/504 |
| 5,841,967 A | | 11/1998 | Sample et al. |
| 5,870,588 A | * | 2/1999 | Rompaey et al. ............. 703/13 |
| 5,937,184 A | * | 8/1999 | Rao ............................. 703/20 |
| 6,006,022 A | | 12/1999 | Rhim et al. |
| 6,009,256 A | * | 12/1999 | Tseng et al. ................... 703/23 |
| 6,112,023 A | * | 8/2000 | Dave et al. .................... 703/27 |
| 6,230,303 B1 | * | 5/2001 | Dave ............................ 716/18 |
| 6,272,451 B1 | * | 8/2001 | Mason et al. ................. 703/22 |
| 6,289,488 B1 | * | 9/2001 | Dave et al. .................... 716/1 |
| 6,356,862 B2 | | 3/2002 | Bailey |
| 6,415,384 B1 | * | 7/2002 | Dave ........................... 713/100 |
| 6,550,042 B1 | * | 4/2003 | Dave ............................. 716/1 |
| 6,584,436 B2 | * | 6/2003 | Hellestrand et al. .......... 703/13 |
| 6,622,287 B1 | * | 9/2003 | Henkel .......................... 716/2 |

OTHER PUBLICATIONS

Toporkov, Performance–Complexity Analysis in Hardware–software Codesign for Real–time Systems, IEEE 1995.*
Stoy et al., An Integrated Modelling Technique for Hardware/Software Systems, IEEE Jun. 1994.*
Carreras et al., A Co–design Methodology Based on Formal Specification and High Level Estimation, IEEE 1996.*
Stoy et al., Re–Partioning for Hardware/software Co–Synthesis, IEEE 1997.*
Harkin et al., Accelerating Embedded Applications using Dynamically Reconfigurable Hardware and Evolutionary Algorithms, IEEE 2000.*
Nascimento et al., A Repartitioning and HW/SW Partitioning Alogrithm ot the Automatic Design Space Exploration in the Co–Synthesis of Embedded Systems, IEEE Jun. 2001.*

* cited by examiner

Primary Examiner—W. D. Thomson
(74) Attorney, Agent, or Firm—Klarquist Sparkman LLP

(57) ABSTRACT

A tool is described herein for optimizing the design of a hardware-software system. The tool allows a designer to evaluate the potential improvement in system performance that may be realized by moving selected software components of the system to a hardware implementation. In one aspect, the tool automatically generates a performance profile of an original form of the system. The performance profile of the original form of the system may be used to select software components of the system to be moved to hardware. In another aspect, the tool generates an estimated performance profile of a repartitioned form of the system by modifying the performance profile of the system. The estimated performance profile of the repartitioned system is compared to the performance profile of the original form of the system to verify benefits, if any, of repartitioning. Such verification is accomplished without the need to actually repartitioning the system or measuring the performance of the entire repartitioned system.

36 Claims, 22 Drawing Sheets

| Transaction | Source | Time(ns) | Address | Destination Address or Type of Cycle |
|---|---|---|---|---|
| ... | | | | |
| Branch Record | core | 27800 | 000002E8 | 000000B4 |
| Bus Record | bus | 28300 | 000000C0 | 931 fetch 932 |
| Bus Record  935 | bus | 29000 | 30007FE8 | write |
| Memory Record | core | 5000 | 000000EC | fetch |
| ...  970 | | | | |
| Bus Record | bus | 35500 | 00000068 | fetch |
| Memory Record  955 | core | 35500 | 00000068 | fetch  965 |
| Bus Record | bus | 36000 | 0000006C | fetch |
| Memory Record | core | 36000 | 0000006C | fetch |
| Bus Record | bus | 36500 | 00000070 | fetch  941 |
| Memory Record | core | 36500 | 00000070 | fetch |
| Branch Record  960 | core | 36500 | 000000E4 | 00000068 |
| Bus Record  940 | bus | 37000 | 00000074 942 | fetch |
| Memory Record | core | 37000 | 00000074 | fetch |
| Bus Record | bus | 37600 | 30007FD4 | write |
| Memory Record | core | 37600 | 30007FD4 | write  950 |
| Bus Record | bus | 37800 | 30007FD8 | write |
| ... | | | | |
| Bus Record | bus | 304700 | 000000E8 | fetch |
| Memory Record  945 | core | 304700 | 000000E8 946 | fetch |
| Bus Record | bus | 305200 | 000000EC | fetch |
| Memory Record | core | 305200 | 000000EC | fetch |
| Bus Record | bus | 305700 | 000000F0 | fetch |
| Memory Record | core | 305700 | 000000F0 | fetch |
| Branch Record | core | 305700 | 000000AC | 000000E8 |
| Bus Record | bus | 306200 | 000000F4 | fetch |
| Memory Record | core | 306200 | 000000F4 | fetch |
| Bus Record | bus | 306700 | 000000D8 | fetch |
| Memory Record | core | 306700 | 000000D8 | fetch |
| ... | | | | |

FIG. 10

| SOFTWARE COMPONENTS | EXECUTION TIME | PERCENTAGE OF TOTAL EXECUTION TIME |
|---|---|---|
| FOO | 106 | 53% |
| FOO BAR | 50 | 25% |
| ALB | 30 | 15% |

FIG. 19A

| Transaction Type of Info | Source CPU/or BUS | Time(ns) Stamp | Source/Address | Destination Address/ Type of Cycle Bytes |
|---|---|---|---|---|
| ... | | | | |
| ... | | | | |
| Branch Record | core | 27800 | 000002E8 | 000000B4 |
| Bus Record | bus | 28300 | 000000C0 | fetch |
| ... | | | | |
| Memory Record 970 | core | 35000 | 000000EC | fetch |

Up to here the file is the same. This is where we start fetching the call to FOO().
The function prolog is inserted here:

| Bus Record | bus | $t_1$-15 | dest | fetch |
| ... 1910 | | | | |
| Memory Record | core | $t_1$+24 | dest+12 | fetch |

Here we add the records for the processing of the function. Get lock for co-processor (once per function call):

| Bus Record | bus | $t_2$ | code_space | fetch |
| ... 1915 | | | | |
| Memory Record | core | $t_2$+15 | code_space | fetch |

Send input parameters (repeat for each input parameter):

| Bus Record | bus | $t_3$ | code_space | fetch |
| ... 1920 | | | | |
| Memory Record | core | $t_3$+30 | code_space | fetch |

Set ready bit to begin processing (once per function call):

| Bus Record | bus | $t_4$ | code_space | fetch |
| ... 1925 | | | | |
| Memory Record | core | $t_4$+40 | coproc_reg | write |

Wait in loop until wait period exceeds time required for hardware FOO to complete processing:

| Bus Record | bus | $t_5$ | code_space | fetch |
| ... 1930 | | | | |
| Memory Record | core | $t_5$+45 | code_space | fetch |

| Transaction Type of Info | Source CPU/or BUS | Time(ns) Stamp | Source/Address | Destination Address/ Type of Cycle Bytes |
|---|---|---|---|---|

Continued from FIG. 19A

Complete processing (once per function call):

| | | | | |
|---|---|---|---|---|
| Bus Record | bus | $t_6$ | code_space | fetch |
| ... | | | | |
| Memory Record | core | $t_6$+20 | code_space | fetch |

Pick up results 1935 (repeat for each output parameter):

| | | | | |
|---|---|---|---|---|
| Bus Record | bus | $t_7$ | code_space | fetch |
| ... | | | | |
| Memory Record | core | $t_7$+15 | code_space | fetch |

Release Lock on 1940 coprocessor (once per function call):

| | | | | |
|---|---|---|---|---|
| Bus Record | bus | $t_8$ | code_space | fetch |
| ... | | | | |
| Memory Record | core | $t_8$+45 | coproc_reg | write |

Now we return 1945 control to the main function. Add the records from the function epilog:

| | | | | |
|---|---|---|---|---|
| Bus Record | bus | $t_9$-20 | func_adr | fetch |
| ... | | | | |
| Memory Record | core | $t_9$ | stack+10 | read |

From here the records 1950 are the same until the next call to count():

| | | | | |
|---|---|---|---|---|
| Bus Record | bus | 304700 | 000000E8 | fetch |
| Memory Record | core | 304700 | 000000E8 | fetch |
| Bus Record | bus | 305200 | 000000EC | fetch |
| Memory Record 1955 | core | 305200 | 000000EC | fetch |
| Bus Record | bus | 305700 | 000000F0 | fetch |
| Memory Record | core | 305700 | 000000F0 | fetch |
| Branch Record | core | 305700 | 000000AC | 000000E8 |
| Bus Record | bus | 306200 | 000000F4 | fetch |
| Memory Record | core | 306200 | 000000F4 | fetch |
| Bus Record | bus | 306700 | 000000D8 | fetch |
| Memory Record | core | 306700 | 000000D8 | fetch |
| Bus Record | bus | 307200 | 000000DC | fetch |

...
...

REPARTITIONING PERFORMANCE ESTIMATION IN A HARDWARE-SOFTWARE SYSTEM

TECHNICAL FIELD

The technical field relates to electronic system design and more particularly relates to optimizing system design by repartitioning hardware and software components.

BACKGROUND

Many digital systems being designed today are embedded systems, which generally consist of both software and hardware components. Such embedded systems are found in a wide variety of applications, such as cellular phones, microwave ovens, automobiles, etc. As with any system, designers of an embedded system strive to obtain better performance by attempting to increase the processing speed of the system as a whole, while trying to reduce the cost and power consumption associated with the hardware components.

One factor that impacts the performance of an embedded system is whether a given function of the system is implemented as hardware or software. Implementing a particular function in software provides flexibility because software is easily modifiable, whereas it is usually cost prohibitive to change hardware components. On the other hand, implementing a function in hardware is generally faster than software. Hardware implementation may also reduce the demand on the processors executing the software and speed up software execution. Furthermore, by implementing a function in hardware, a designer may be able to use smaller, less powerful processors, which reduces the cost of the system as a whole. These are some of the competing goals a designer needs to balance in arriving at an optimal design.

The designer may need to move software components into hardware to improve system performance. Prior to such a move, the system performance may need to be measured at least once to select software components to be moved to hardware. Moreover, the system performance may need to be measured again after the move to verify improvements (if any) in the system's performance. Such a process may have to be repeated several times until an optimal system design is found. Unfortunately, this process is time consuming and cost prohibitive.

Until recently, software and hardware components could not even be tested or verified to see if they functioned together. Hardware emulators or simulators were used to verify the hardware design and the software components were tested separately using a compiler, debugger and other software testing tools. Currently, tools are available for co-verification of software and hardware components of an embedded system. One such tool is described in U.S. Pat. No. 5,771,370 (hereafter "the '370 patent") to Klein. Designers may now use such co-verification tools to simultaneously verify that the hardware and software components of a system function together to yield the desired results.

Co-verification tools are limited to verifying that a completely designed system performs its intended functions. Such systems do not currently have the capability to inform the designers about other performance factors such as, which software functions may use the most processor capacity, perform the most memory accesses, or use the bus most often. Such information can aid a designer in deciding whether to implement a given functionality of the system in software or hardware. Some software profiling systems (e.g. Microsoft® Visual Studio® or Rational® Purify®) have the capability to provide a profile of a software execution that may pinpoint which of the various functions implemented in the software require the most processor time.

Once such functions are identified, they may be selectively moved to hardware to improve system performance. However, moving selected functions to hardware does not always result in improved system performance. Thus, the system performance may need to be measured after each repartitioning to verify any improvements, which can be costly and time consuming. Moreover, conventional profiling systems do not measure the system accurately (for example, they cannot account for the performance of the hardware components). Furthermore, such systems are not capable of providing a designer with the foresight of whether repartitioning a particular function to hardware can improve system performance or not. Currently, a system has to actually be repartitioned to verify any benefits of repartitioning.

Therefore, there is a need for a tool that can quickly and efficiently generate an accurate estimate of the performance profile of a repartitioned system.

SUMMARY

As described herein, a tool is provided that allows designers to optimize the performance of a system by selecting functions to be moved from software to hardware and evaluating the system for any performance gains. The designers can select the various software functions and evaluate the impact (on the performance of the system) of implementing the selected software function in hardware. This allows the designers to quickly arrive at an optimal design for the hardware-software system by determining an optimal partition of the system between its hardware and software components.

In one aspect, the tool may create performance profiles of the existing system and use the profile for selecting software components to be modeled as hardware components. The profiles are adapted to provide performance data related to utilization of one or more processors running the software. The profile data may be used to determine which of the software functions place the greatest demands on the processors' capacity and select such functions to be implemented in hardware instead.

In another aspect, the tool models repartitioning hardware-software systems by removing selected components from software and replacing them with new hardware components and modified software components adapted to function together to achieve the same functionality as the original system. The modified software components correspond to the removed components and are automatically generated and adapted to provide inputs to and receive outputs from the newly generated hardware components.

In another aspect, the performance profile of the repartitioned system may be generated by collecting performance data related to the execution of only the newly added components (e.g. the new hardware components and modified software components). Such performance data is then used to replace (in the original profile) the performance data related to the original software functions to generate a profile of the repartitioned system. Thus, a profile of the repartitioned system is generated quickly and efficiently by reusing previously collected performance data of components of the system that remain unchanged through the repartitioning.

In an additional aspect, the performance data related to the execution of the modified software components is collected without having to execute (or model the execution of) each and every instance of the modified software component. Initially, a library may be created to store performance data related to execution of a model modified software component. Such a library is used to assemble the performance data for specific instances of modified software components. The data for each instance of the modified software component may differ according to various factors particular to each instance (e.g. the number of input and output data associated with such a component).

In another aspect, the performance data of the new hardware components are collected by first generating a representation of the hardware components adapted to model the behavior of a physical implementation of the new hardware components. The representation of new hardware components is then executed with its timing set to correspond to that of a proposed target system implementing the repartitioning. This allows the model to function nearly identical to the proposed physical implementation of the new hardware components and improves the accuracy of the collected data. Such representation of the hardware components may be in various forms including, programming languages (e.g. C, C++, JAVA, etc.), HDL, etc. Later, the HDL description may be synthesized (using a synthesis tool) to implement the repartitioned system.

In a final aspect, all of the various features and capabilities of the system mentioned above are done automatically, allowing the designers to shorten the design cycles of their products. These and other aspects will become apparent from the following detailed description, which makes references to the accompanying drawings.

BRIEF DESCRIPTION OF THE DRAWINGS

FIG. 9 is an exemplary time log corresponding to the execution of an original hardware-software system used for generating the performance profile of the original system prior to repartitioning.

FIG. 10 is an exemplary table containing a summary of the time data from the time log of FIG. 9, related to the execution of the instructions of the various software components for generating a performance profile of the original system.

FIG. 19A is an exemplary estimated time log corresponding to the execution of the repartitioned hardware-software system used for generating the performance profile of the repartitioned system.

FIG. 19B is the continuation of the time log of FIG. 19A.

DETAILED DESCRIPTION

In a hardware-software system having both hardware and software components, deciding whether to implement a given function of the system as software or as hardware can impact the system's overall performance. In order to arrive at an optimal system design, a designer may need to select functions originally implemented in software and move them to hardware to improve system performance. This is commonly referred to as "repartitioning" a hardware-software system. Data related to the performance of the system's components may need to be collected and evaluated prior to selecting the functions to be moved from software to hardware. Such performance data may need to be collected and evaluated again each time the system is repartitioned to verify improvements in performance. Several iterations of repartitioning may be necessary before an optimal design is achieved. To achieve design optimization by repeatedly repartitioning and evaluating the system performance may be time consuming without the aid of automation.

A designer may use the methods and systems described below to automatically optimize system performance by evaluating and analyzing the performance of the original system, selecting software components to be repartitioned to hardware and estimating the performance of such repartitioned system to determine whether repartitioning can improve system performance.

Exemplary Hardware-software System

Figure 1:
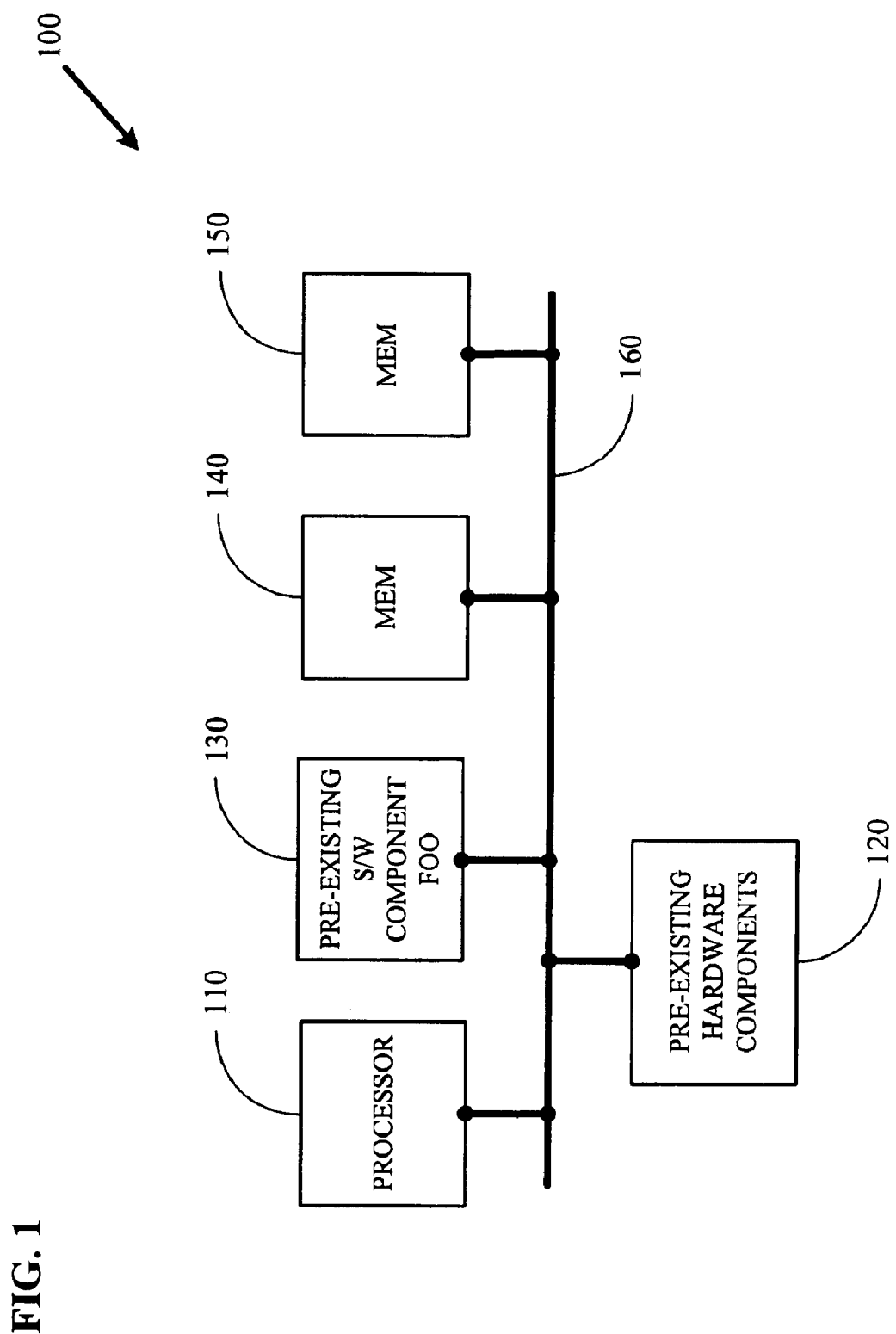
FIG. 1 is a block diagram of an exemplary hardware-software system prior to conversion of selected software components to hardware components.

FIG. 1 shows an exemplary hardware-software system 100 comprising both software components and hardware components adapted to function together to implement the desired functionality of the system. The system 100 comprises a processor instance 110 (e.g. Intel® Pentium®4, a RISC processor, etc.). The processor instance 110 may be adapted to receive and execute instructions from software programs, such as the pre-existing software component FOO 130. Thus, a part of the functionality of the system may be implemented in the form of software programs. The rest of the functionality of the system may be implemented in the form of hardware logic components 120. The system may include one or more memory elements, such as memories 140, 150. One or more system buses 160 may be provided for the various components to communicate with each other. Communication means other than system buses 160 (e.g. a network of buses, a point-to-point network, etc.) may also be used to connect the components together.

Although FIG. 1 shows just one processor instance 110, it is possible for a hardware-software system to have multiple processors of various types for handling multiple functions. Furthermore, software components other than FOO 130 may also be stored at memory elements 140 and 150. The other software components may include operating system components and other software necessary to implement the system functionality. The memory elements 140 and 150 may be a wide variety of memory types, such as static RAM (Random Access Memory), dynamic RAM, hard disc drives, etc. These memory elements may also be accessed by the hardware components 120 for processing (e.g. receiving input data or storing output data). Additionally, the processors 110 may also access data or instructions from other sources outside of the system 100 for implementing some or all of the desired system functionality.

The hardware components 120 may include off-the-shelf gate level logic, custom hardware (e.g. PLD's (Programmable Logic Devices)), or ASIC's (Application Specific Integrated Circuit). Although the processor instance 110 is shown separately in FIG. 1, it may also be integrated into the other hardware components. Similarly, memory elements 140 and 150 may be integrated into the hardware components. However, unless otherwise specified, all references to hardware components hereafter should be assumed to refer to those hardware components implementing the functionality of the system that is not implemented using software components.

To optimize the design of system 100, a designer may have to select some functions of the system to be initially implemented as software components 130 and the rest as hardware components 120. It is also possible that the functionality of the system may be initially implemented entirely in software. If the performance is unsatisfactory, some of the functionality originally implemented as software components 120 may be converted to hardware components 130 to speed system performance.

Figure 2:
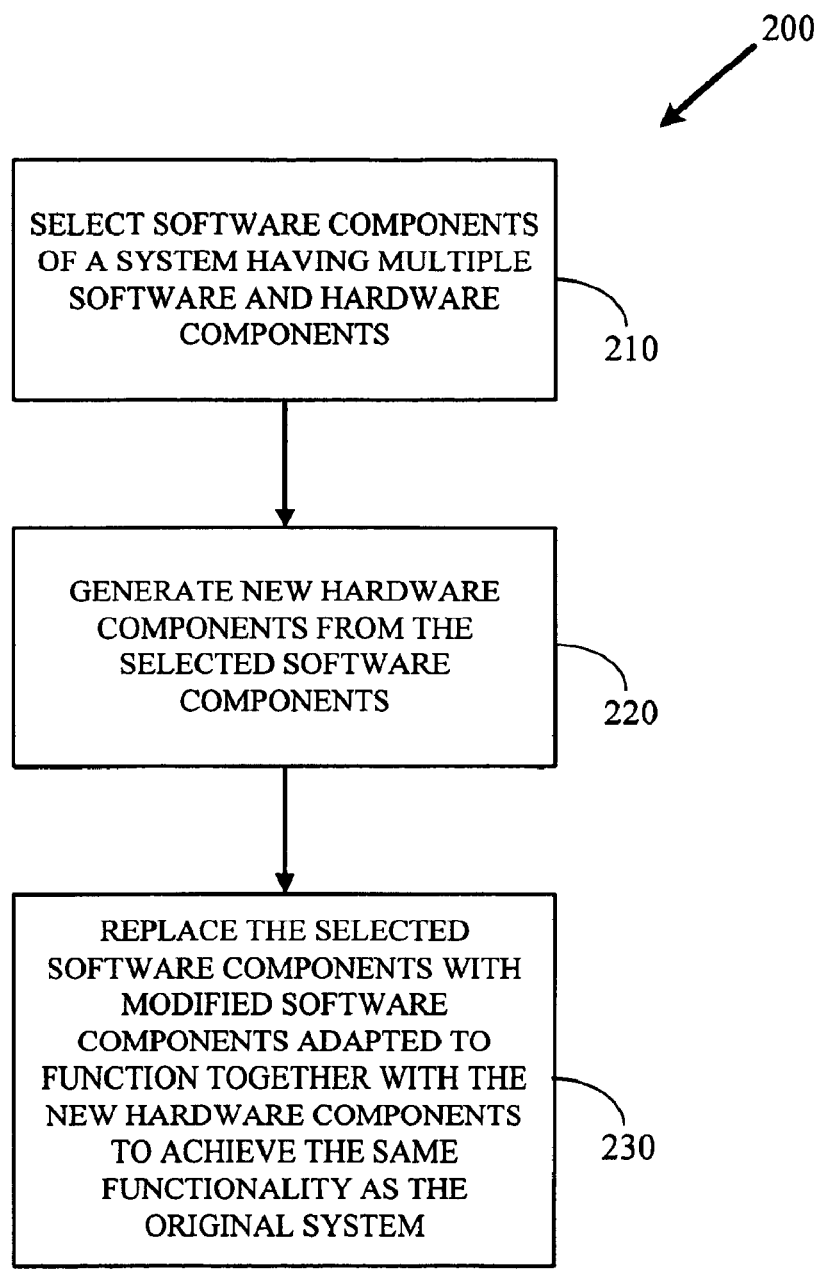
FIG. 2 is a flow chart of an exemplary method for optimizing the performance of a hardware-software system by selectively converting software components of the system into hardware components.

Exemplary Method for Optimizing the Performance of the Hardware-software System by Repartitioning FIG. 2 illustrates an exemplary method 200 for optimizing the performance of a hardware-software system, such as the one shown in FIG. 1. At 210, one or more of components of software implementing various functions of the system are selected. As described further below, the selected software components are generally those components that use a significant amount of system resources. At 220, new hardware components are generated from the selected software components. Software components of various levels of complexity corresponding to various levels of system functionality may be selected for conversion to hardware. For example, an entire calculator program originally implemented in software can be selected and converted to hardware or individual functions within the calculator program (e.g. ADD or SUBTRACT functions) can be selected and converted to hardware.

Once the software components are identified and corresponding hardware components are generated at 220, the selected software components are replaced by modified software components, at 230, adapted to ensure that the system as a whole maintains its original functionality. Thus, an interface is created within the remaining software to communicate with the newly created hardware components. Such an interface may be necessary because the rest of the components of system continue to send input data to, and/or expect to receive output data from the function originally implemented in software. The interface is capable of directing such communications through to the newly generated hardware components.

Once some of the functions originally implemented in software are converted into hardware implementations, the original design of the system 100 of FIG. 1 is said to have been "repartitioned" or "partitioned"(if the system functionality was initially implemented entirely in software) between its hardware and software components. A more optimal design may be achieved in this manner.

Figure 3:
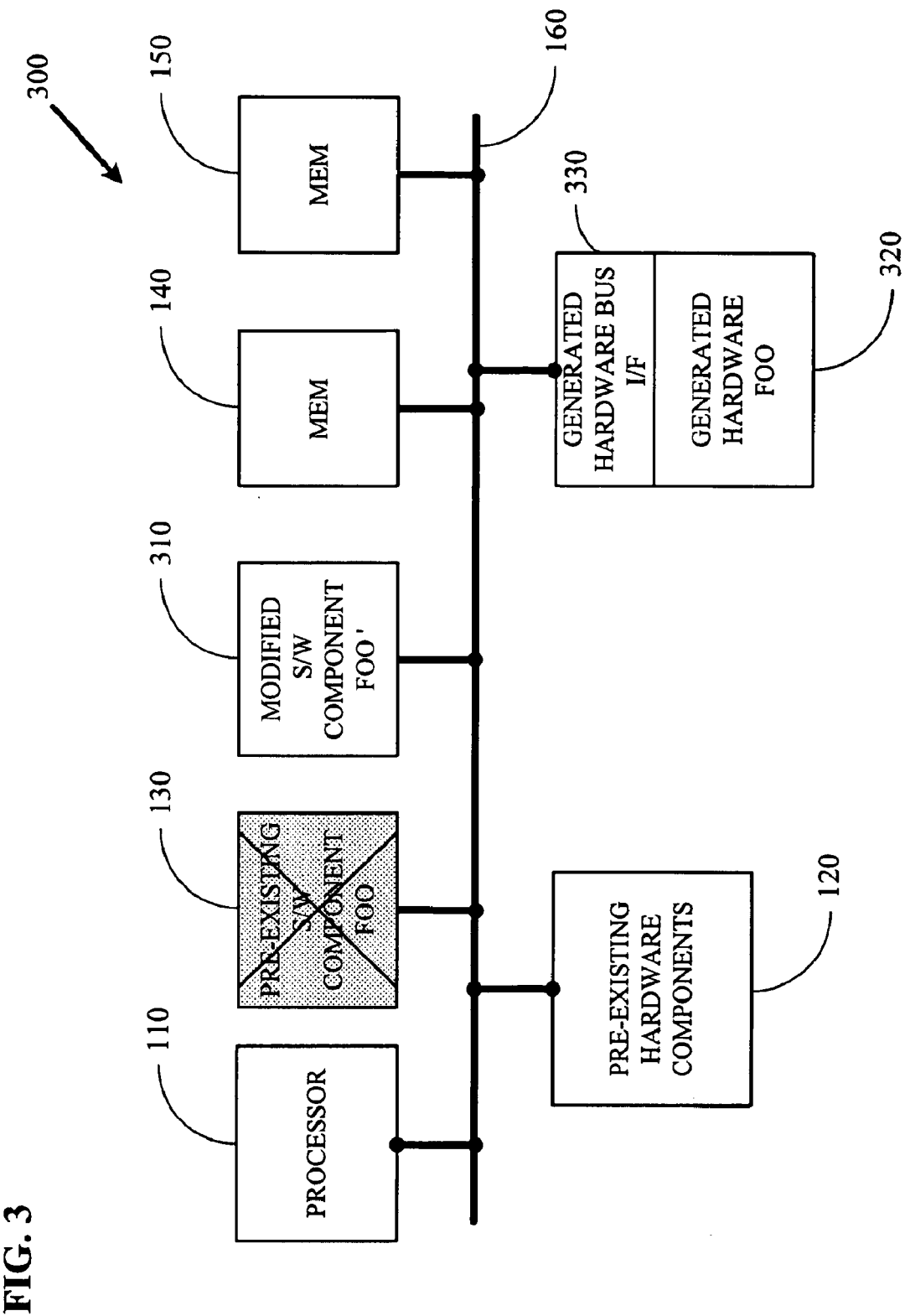
FIG. 3 is a block diagram of an exemplary hardware-software system after selected software components of the system are converted to hardware components according to the method of FIG. 2.

Exemplary Hardware-software System after Selected Software Components have been Converted to Hardware FIG. 3 illustrates the hardware-software system 100 of FIG. 1 after being repartitioned between its hardware and software components using the methods described above with reference to FIG. 2. In FIG. 3, the repartitioned system 300 has retained the processor instance 110, the memory elements 140 and 150, the system bus 160 and the pre-existing hardware components 120. However, as described above with reference to FIG. 2, a selected software component, such as FOO at 130, has been removed from the repartitioned system 300. The software component FOO 130 is replaced by the modified software component FOO' 310 and a newly generated hardware component FOO 320. The modified software component FOO' 310 in combination with the hardware 320 are adapted to enable the repartitioned system 300 to continue to maintain the same functionality as the original system 100 of FIG. 1. More specifically, the modified software component 310 may be adapted to direct the communications associated with the original software component FOO 130 to its corresponding newly generated hardware component at 320 in the repartitioned system 300.

Furthermore, it may be necessary to enable the newly generated hardware component 320 to send and receive communications with the rest of the system via the system bus 160. To that end, it may be necessary to generate a hardware bus interface 330. The modified software component 310 and the generated hardware bus interface 330 are used to enable the newly generated component 320 to function with the rest of the system without changing the functionality of the original system 100.

Exemplary Method for Verifying whether Hardware-software System Performance can be Improved through Repartitioning Repartitioning may not always result in improved system performance. Therefore, it may be helpful to compare the system performance prior to repartitioning and after repartitioning to determine whether repartitioning improves a system's performance. Furthermore, performance data may also be used to determine the most ideal software components to be converted to hardware.

Once the system performance is measured prior to its repartitioning, it may need to be measured again each time the system is repartitioned to verify the impact of repartitioning. Such a process can be time consuming and costly. Moreover, repeatedly collecting the performance data for all the components of the repartitioned system may be unnecessary because most of the system is likely to remain unchanged by the repartitioning process.

Figure 4:
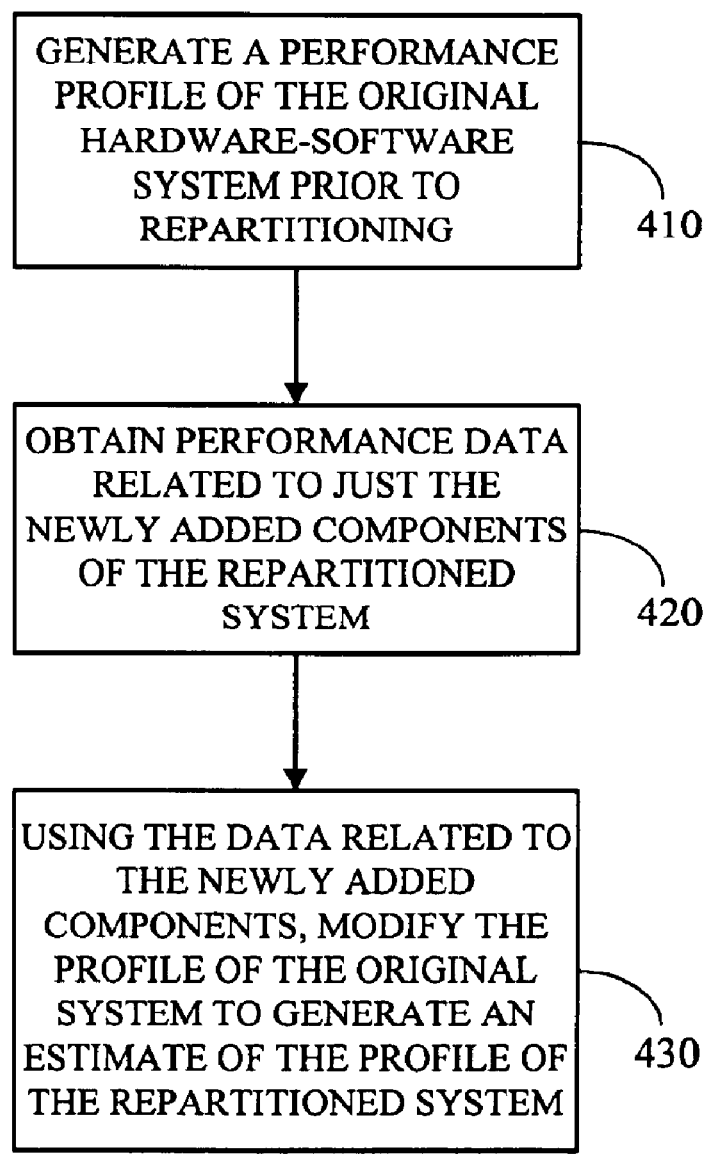
FIG. 4 is a flow chart of an exemplary process for verifying improvements in system performance through repartitioning by estimating the performance of a repartitioned system.

FIG. 4 shows an exemplary process for verifying improvements, if any, in system performance (due to repartitioning) without collecting performance data for the entire system. At 410, a performance profile of an original system (prior to repartitioning) is generated. Then at 420, performance data related to the execution of only the newly added components (e.g. modified software components and new hardware components) is obtained. As explained below, such data may be obtained by several methods (e.g. actually executing the new components, or by modeling their execution or by collecting such data from a data source). The new data can then be used at 430 to modify the profile of the original system to generate an estimate of the repartitioned system's profile. The modification is achieved by replacing the performance data of the original components with the performance data of the newly added components. Such a process is far less time consuming because most of performance data collected for profiling the original system can be reused to create the estimated profile of the repartitioned system.

Alternatively, the performance profile of the original system may also not need to be generated during the process of system design optimization. For example, such a profile may be made available through a data source. Also, the performance data for the newly added components of a repartitioned system (e.g. the modified software components, and their new hardware components) may be obtained separately.

Exemplary Method for Optimizing System Performance by Estimating Performance of a Repartitioned System The process of optimizing the system performance through repartitioning will be less valuable without the use of design automation tools that allow measurement and verification of hardware-software system's performance without having to create a physical implementation of the hardware components. Instead of physically implementing the hardware components of the system, the functions to be implemented as hardware may be described using a hardware description language (HDL) (e.g. Verilog or VHDL). The hardware description in HDL can then be used by hardware simulation tools such as logic simulators (e.g. ModelSim by Mentor Graphics® of Wilsonville, Oreg.) or hardware emulation tools for modeling the behavior of the hardware components. In case of hardware emulators, the HDL description may be fed to synthesis tools (e.g. Leanordo Spectrum by Mentor Graphics® of Wilsonville, Oreg.) to generate a synthesis of the hardware components suitable for use by the emulator tools to model the behavior of the hardware components. Such tools allow a designer to verify and measure the performance of a hardware design without the need to develop a physical implementation of the hardware. Furthermore, such tools may be used in conjunction with other tools capable of estimating the performance of a repartitioned system without the need to measure the entire system's performance each time the system is repartitioned.

Figure 5:
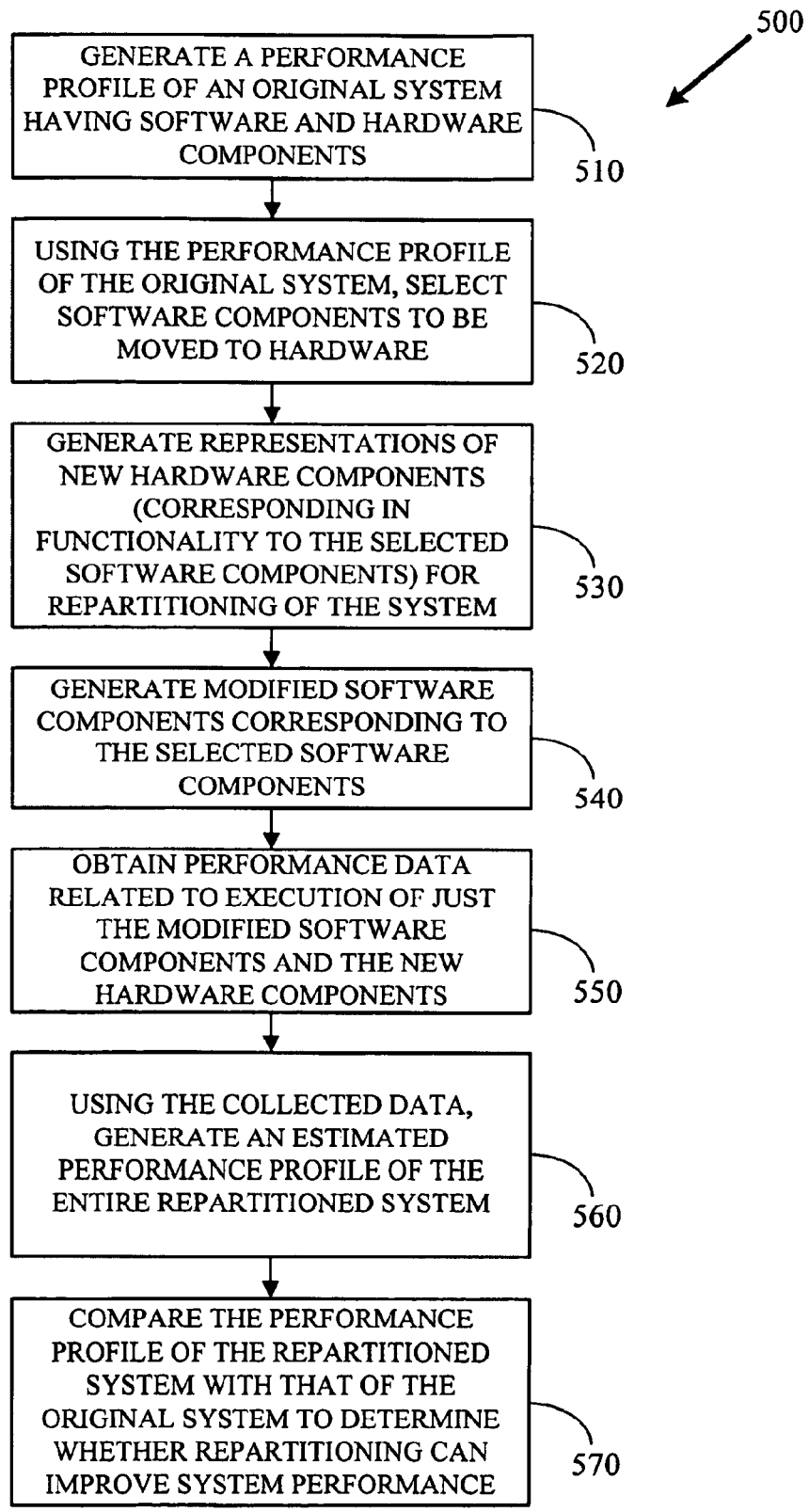
FIG. 5 is a flow chart depicting an exemplary method for optimizing the performance of the hardware-software system by modeling a repartitioned system and using the methods of FIG. 4 to estimate the performance of the repartitioned system.

FIG. 5 shows such a process 500 for selecting a software function to be moved to hardware in a repartitioned system and verifying the improvement in the performance of the repartitioned system without having to measure the performance of the entire system. At 510, a performance profile of the original hardware-software system is generated, which is used at 520 to select the software components to be moved to a hardware implementation in a repartitioned system. Such a profile includes data indicative of the system's performance as a whole and particularly data relevant to the execution of the various functions implemented as software components. For example, data relevant to software execution may include time data associated with execution of the software instructions, and memory and bus transactions initiated by processor during the software execution. Using such profile data, a designer is able to determine which of the software functions most negatively impact the performance of the system and select such software components to be moved to a hardware implementation (process block 520).

Software components may be originally in form of any of the numerous computer-programming languages (e.g. C, C++ or JAVA). Once the software components are selected to be moved to a hardware implementation, at 530, hardware representations of the selected software components may be generated by converting from their current description in a programming language. Such representations are adapted to model the behavior of a hardware component whose functionality corresponds to that of the software components selected at 520. The hardware representations may be in form of a programming language (e.g., C, C++, JAVA), in form of synthesizable HDL, etc. If needed, the synthesizable HDL description can later be used to generate a hardware component design to be used for physical implementation of the repartitioned system.

At 540, modified software components are generated. The modified software components are software interfaces adapted to intercept and direct system communications related to the original software components to their corresponding newly generated hardware components. If and when the repartitioned system is implemented, these modified software components will be used to replace the repartitioned software components of the original system.

Once the new hardware components and the modified software components are generated, their performance data may be obtained at 550. One way to obtain such data may be to execute or model the execution of just the modified software components in conjunction with their corresponding newly generated hardware components each time a system is repartitioned.

Alternatively, part of such data may be obtained by collecting the data from a data source. Performance data generated by various instances of modified software components are somewhat similar and may only differ according to the number of inputs and outputs of a particular component. Therefore, a library of the performance data associated with modified software components may be created and used to assemble the performance data for a particular instance of a modified software component. Thus, it may not be necessary to generate and execute a modified software component just for the purpose of determining whether repartitioning improves system performance.

The performance data associated with executing just the modified software components and their corresponding new hardware components is used at 560 to generate an estimated performance profile of the entire repartitioned system. Then at 570, the estimated performance profile of the repartitioned system may be compared to the profile of the original system to verify that repartitioning will yield improved system performance. The benefits, if any, of repartitioning may be investigated in this manner without actually repartitioning the system, without physically implementing the hardware components of a repartitioned system and without collecting performance data for all components of the repartitioned system.

Exemplary Tool for Measuring the Performance of a Hardware-software System

Figure 6:
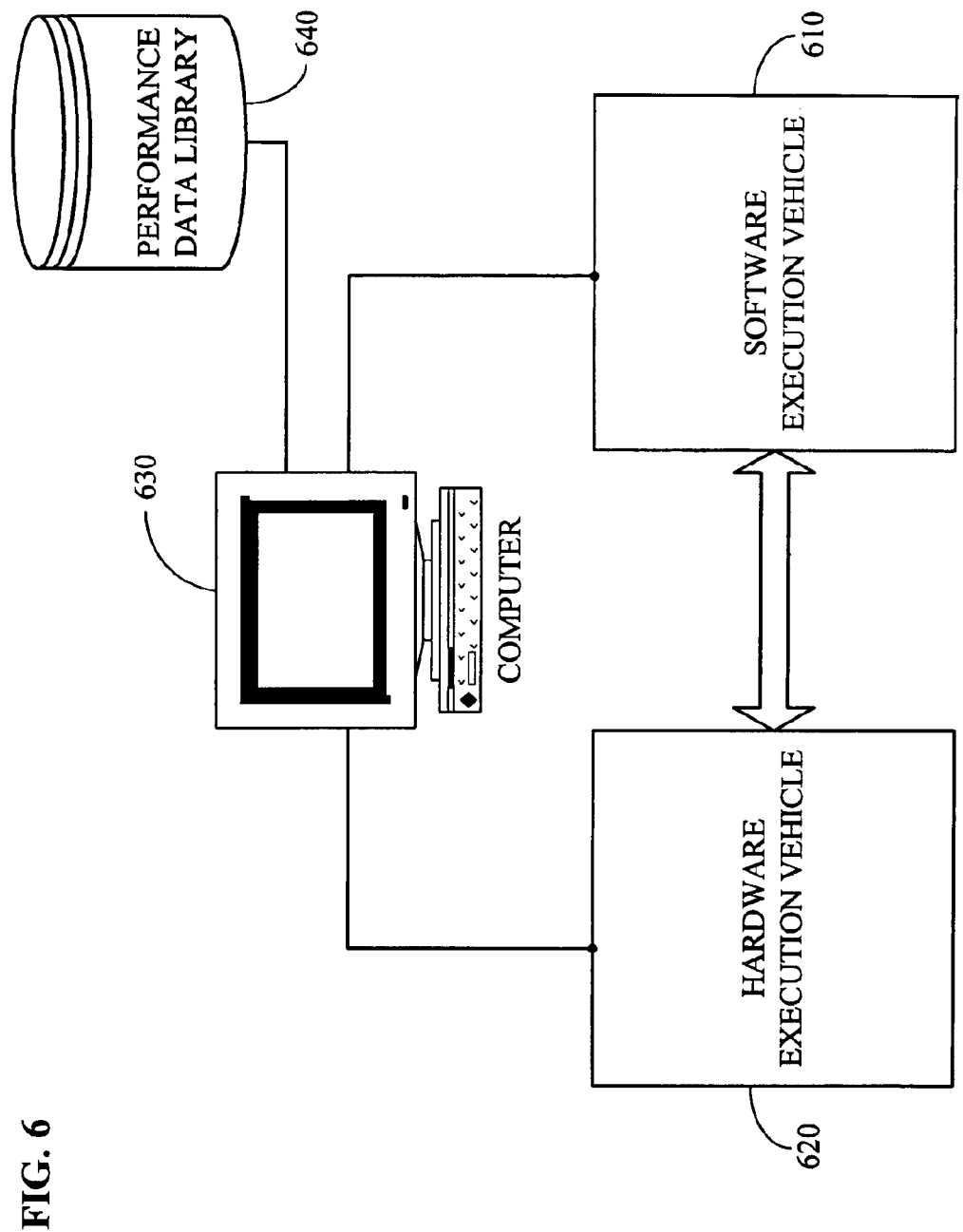
FIG. 6 is a block diagram of an exemplary tool for optimizing the performance of a hardware-software system through repartitioning.

To measure a system's (or any of its component's) performance, the system may be physically implemented or its hardware components may be modeled on a modeling tool, such as an emulator or a simulator. FIG. 6 illustrates an exemplary tool for modeling the behavior of a hardware-software system to measure its performance. The tool comprises a software execution vehicle 610 adapted for modeling the behavior of processors that execute the software components of the system. The tool also comprises a hardware execution vehicle 620 for modeling the behavior of the hardware components of the system.

For example, software execution vehicle 610 may be one or more Instruction Set Simulators (ISS) that are adapted to emulate the behavior of a particular processor. Typically, an ISS emulates a processor's execution of instructions from a compiled software program. Thus, an ISS has the ability to mimic the functionality of a processor and is typically unique to a processor. For example, the ARMulator™ is an ISS that is unique to the processors based on processor designs licensed by ARM® Ltd. of Cambridge, England. Likewise, other processors may have their own corresponding ISS. The software execution vehicle may also be implemented by using In Circuit Emulators (ICE) or other well-known devices. Less complex processors may even be emulated by a physical implementation of a gate level logic design, which can be driven by software components. However the processor may be modeled, it is desirable that the software execution vehicle be capable of generating the data associated with the execution of the software components.

Also, the hardware execution vehicle may be implemented in many different ways. For example, a logic simulator may be used to model the hardware components. A typical logic simulator is capable of interpreting hardware design descriptions in various forms (e.g. HDL) and providing overall control of simulating the functionality of the design. An example of a logic simulator is ModelSim™ by Mentor Graphics® of Wilsonville, Oreg. The hardware execution vehicle may also be implemented using FPGAs, accelerators (e.g. an IKOS machine by Mentor Graphics® of Wilsonville, Oreg.) or ICEs programmed to implement the functionality of hardware components of the system.

To simultaneously verify the performance of hardware and software components of a system, the software execution vehicle 610 and the hardware execution vehicle 620 communicate with each other. Furthermore, a computer 630 may be provided to control the execution of the software execution vehicle 610 and the hardware execution vehicle 620. A source code debugger program (not shown) may be used by the computer 630 to control the execution of the software components on the software execution vehicle 610. A debugger provides a user greater control over the execution of a software program, for example, by allowing the user to set break points to stop the execution as desired for debugging and troubleshooting. Similar controls may be implemented for the hardware execution vehicle.

The software execution vehicle and the hardware execution vehicle do not have to function simultaneously or be connected to each other to model the entire hardware-software system or its various components. For example, the designer may execute software components separately on a general purpose computer and use profiling software (e.g. Microsoft® Visual Studio® or Rational® Purify®) to collect performance data related to software. However, such methods do not provide the complete picture of the execution of a system having both hardware and software components. Better modeling of a system having hardware and software components is possible by modeling the system as a whole with the hardware and software components functioning together.

Once the hardware execution vehicle and the software execution vehicle are functional and there is a mechanism in place to control the execution, the performance data related to an entire system or its individual components may be collected. For example, performance data for the entire original system may be collected using the software and hardware execution vehicles. Furthermore, the software execution vehicle may be used to model the execution of just the modified software components and the hardware execution vehicle may be used to model the execution of newly generated hardware components. Data may be used to select the software components to be moved to repartition the system and to determine whether a system's performance is improved through repartitioning. The collection of the performance data and the processing of the collected data to create a profile may be done using the same computer 630 or by programming other computers. Furthermore, the computer 630 (or the other computers) programmed to collect and process performance data may also be connected to a performance data library 640 storing some or part of the performance data (e.g. performance data related to execution of modified software components). The performance data may be collected using such libraries 640 instead of a software execution vehicle 610 and/or a hardware execution vehicle 620. Such libraries may comprise a single database or multiple databases in a distributed network.

Alternatively, the collection of data may also be accomplished separately using test equipment well known in the art (e.g. logic analyzers) and the collected data may later be processed to create a profile.

Exemplary Implementation of a Tool for Modeling a Hardware-software System

The software execution vehicle 610 and the hardware execution vehicle 620 of FIG. 6 may be connected together directly such as on a test board with the various FPGAs modeling both the hardware components of the system and the processors executing the software components.

Figure 7:
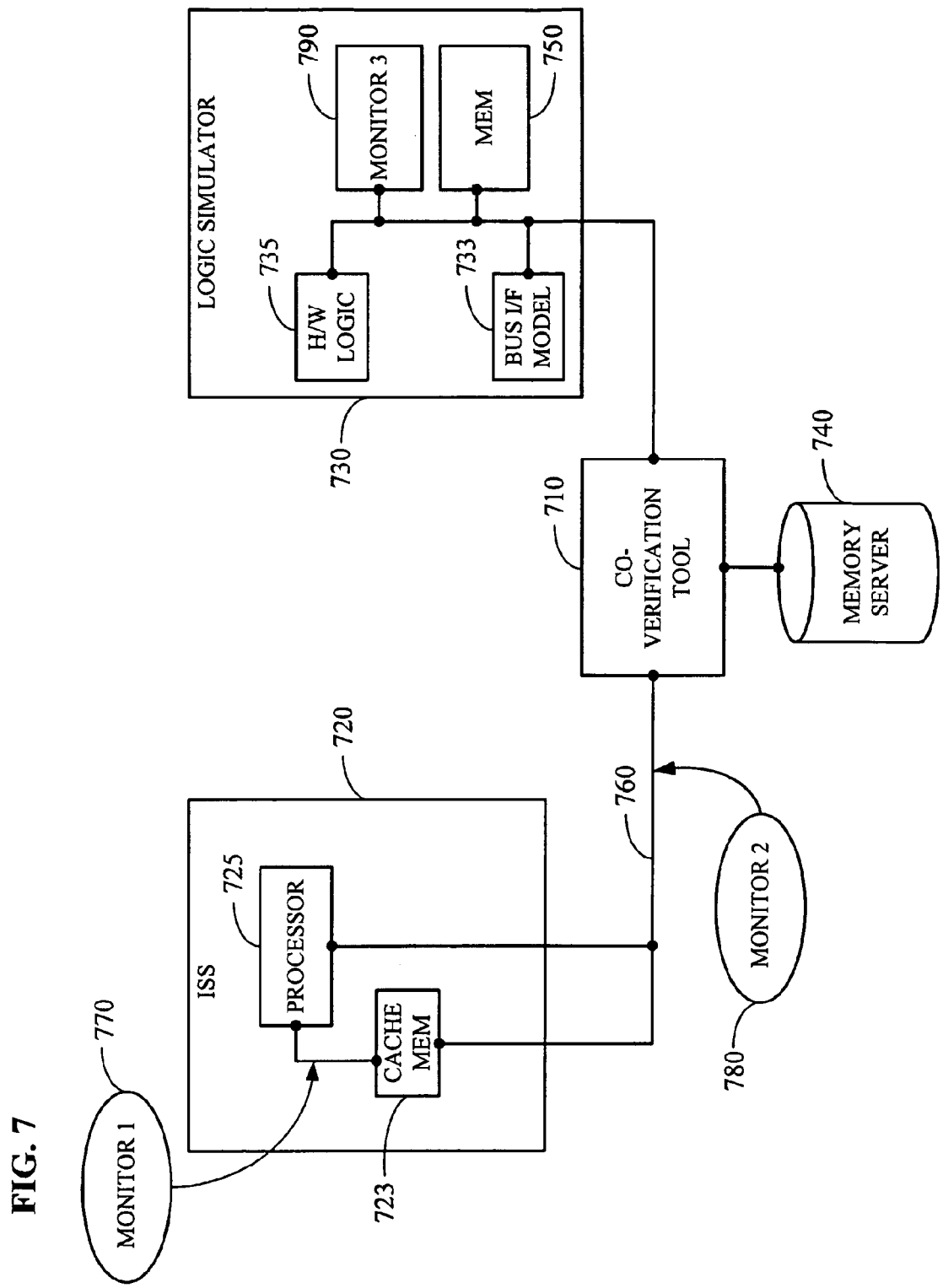
FIG. 7 is a block diagram depicting an exemplary implementation of the tool shown in FIG. 6.

Alternatively, if one or more ISS's are used as software execution vehicles and logic simulators are used as hardware execution vehicles, a hardware-software co-verification tool may be necessary for modeling the system performance. FIG. 7 illustrates such an exemplary co-verification tool 710 being used in conjunction with an ISS 720 for emulating the processor instance 725 and a logic simulator 730 simulating the hardware logic 735, the system bus 760, the bus interface model 733 and the memory elements 750. The bus interface model 733 has the same pin out as the processor instance 725 being simulated by the ISS 720 and is capable of simulating the communication of the processor instance 725 with the rest of the system. A bus interface model 733 may be necessary because typical ISS's are only capable of emulating the processor instance 725 executing instructions and do not have the capability to drive the communications through to the rest of the system being simulated.

A co-verification tool such as 710 is described in U.S. Pat. No. 5,771,370 (hereafter "the '370 patent") to Klein. When simulating a hardware-software system using ISS's 720 and logic simulators 730, the memory transactions related to software execution may be simulated using the logic simulators 730. However, simulating memory transactions or bus transactions using logic simulators 730 may be time consuming. Typical logic simulators 730 execute at a speed of 1 instruction per second and high-end simulators may execute 2–3 instructions per second. However, typical software programs generate a great number of memory transactions and bus transactions. Thus, simulating the execution of software components of a system using simulators can be very time consuming. Although typical ISS's 720 execute at a speed of 1,000,000 instructions per second, they do not have the capability of emulating the bus transactions and hardware components of a system. Therefore, the co-verification tool 710 may be necessary to model the memory transactions and bus transactions of a system to speed up the modeling process.

The co-verification tool 710, such as the one described in the '370 patent, provides a memory server 740 that stores the software components or data elements typically stored in the memory elements associated with a system (e.g. 750). Instead of using the logic simulator 730 to interact with memory elements 750, the ISS 720 uses the co-verification tool 710 to communicate with the memory server 740 to retrieve instructions from the software components or data elements stored therein. When compared to interacting with the simulator 730, interacting with the memory server 740 is much faster. Thus, using a co-verification tool 710 allows a designer to model the behavior of a hardware-software system having complex software components and do it within times that are reasonable for a designer to pursue repartitioning.

Figure 8:
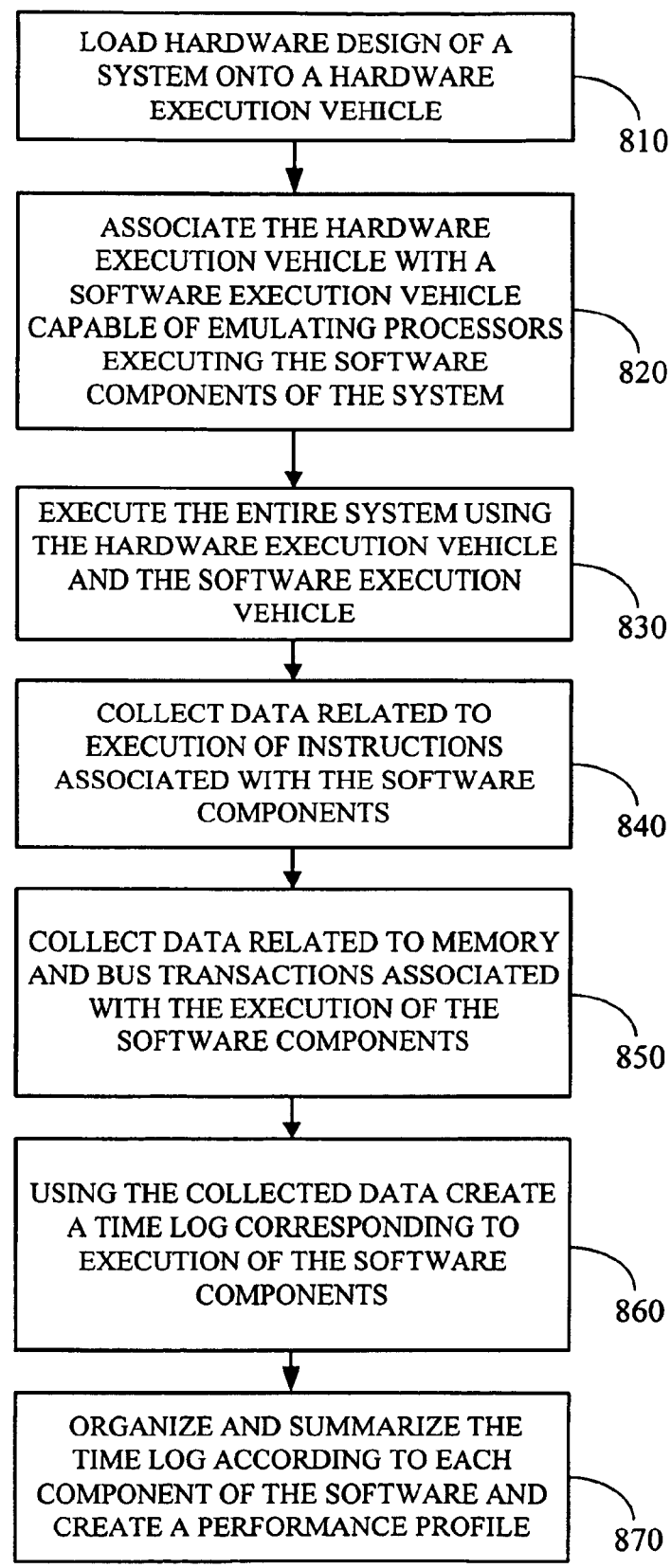
FIG. 8 is a flow chart of an exemplary method for generating a performance profile of the original hardware-software system prior to repartitioning.

Exemplary Method for Generating a Performance Profile of a System Prior to Repartitioning Once a tool for modeling the execution of software and hardware components of a hardware-software system is in place, the tool may be used to generate a performance profile of the original system for optimizing the system performance as described with reference to FIG. 5. FIG. 8 illustrates such an exemplary method for generating a performance profile corresponding to the process 510 of FIG. 5. The profile of the original system may be used for selecting the software components to be converted to a hardware implementation and generating an estimated profile of the repartitioned system. At 810, the existing hardware design is loaded onto a hardware execution vehicle for modeling or implementing the hardware logic related to the hardware-software system. At 820, the hardware execution vehicle is associated with a software execution vehicle capable of modeling the execution of the software components on processors associated with the system. The software execution vehicle and the hardware execution vehicle may be implemented as described with reference to FIGS. 6 and 7. Once the software and hardware execution vehicles are functional, at 830, the system is executed for collecting the data related to its performance. At 840, data related to executing each instruction of the software components is collected. At 850, memory transaction and bus transaction data related to the execution of the software components is collected. Once the data related to execution of instructions, memory transactions and bus transactions are collected, a time log corresponding to execution of the software component is generated at 860. Finally at 870, the time log is organized according to the various sub-components of software being executed to create a performance profile.

Exemplary Time Log Used for Generating a Performance Profile of a Hardware-software System FIG. 9 illustrates an exemplary time log 900 for creating the performance profile of a hardware-software system. The time log 900 is generated by monitoring the performance of the hardware-software system as the system is executed on the modeling tool comprising hardware and software execution vehicles of FIG. 6. The time log 900 contains a record of data related to the execution of the instructions of the software components, memory and bus transactions. As shown in column 920, the time log is ordered in time using a time stamp (measured by a system clock) starting at 0 to the end of the simulation. The time log 900 also tracks the nature of the transactions as shown in column 910, which lists such transaction types as memory, branch (which is related to execution of software instructions) and bus. At column 915, the origin or source of the transaction is listed. For example, the execution of instructions by processors are listed as "core" transactions. Also, the address associated with each of the transactions are recorded at column 925. At column 930, if the transaction is related to a branch record, the destination address is recorded. At 930, if the transaction is related to a memory or bus record, the type of operation (e.g. fetch, write, read etc.) is recorded. The time log 900 is an exemplary illustration, and such a log may be organized in a different manner and contain different records depending on various factors (e.g. type of processors being modeled etc.).

In one embodiment, only the branch records related to the software instructions executed by the processors is recorded in the time log 900. The entry into a branch related to a particular software component and the exit from the branch may be determined by tracking the source address 925 and destination address 930 related to each instruction. Once the addresses are known, executable files associated with the software components may be opened to access their symbol tables. The symbol tables list each of the various software components, their address locations and word sizes. The address information in columns 925 and 930 is compared to the symbol tables to identify which software component is associated with the instructions being executed in the time log 900.

For example, if a software component, such as function MAIN, has an address location between 000000B4–000000FC and a word size equal to 4 and the time log 900 has a branch record 935 with a source address of 000002E8 at 931 and a destination address 000000B4 (which is within the range 000000B4–000000FC) at 932 then a branch entry into function MAIN is identified. The next few time log records show that several other instructions related to function MAIN were executed within the address range corresponding to MAIN. Furthermore, the function MAIN itself may have subfunctions that are called during the execution of MAIN. The time log 900 records calls to and returns from such sub-functions as well.

For example, if function MAIN has a sub-function FOO and its address location is between 00000068 and 000000B0 (with a word size of 4), a branch entry into FOO is indicated at 940 since the destination address at 941 is 00000068. At 945, the time log shows an exit from FOO (return from the call to FOO) because the address (000000E8) at 946 is equal to the original source address outside FOO (000000E4), at 942 (where FOO was last called), plus the word size 4. Here the log indicates that starting at 945 the processor is fetching instructions outside of FOO (at address 000000E8) for processing. Such activity is not related to FOO. Thus, time log records 950 (between 940–945) are identified as branch records associated with the function FOO.

Prior to branch entry into a function, some processors may begin to initiate activity related to preparations for execution of the function. For example, at 955, the log indicates that the processor has begun fetching instructions related to FOO for processing. This is so because the fetch operation at 955 is related to an address (00000068), which is associated with the function FOO. Thus, the records 965 (between 955 and 960) are also related to the execution of the function FOO. Identifying records in this manner is used to select functions to be repartitioned and also to modify the time log of the original system to generate an estimated time log and a profile of the repartitioned system.

The function FOO may be called several times during the execution of the system as a whole. The same process may be repeated to identify all such successive branch records associated with repeated calls to function FOO. Using the symbol tables, the same process may also be repeated to identify records associated with functions other than FOO. However, word sizes may vary according to processors. For example, a processor with 16-bit instruction architecture may have a word size of 2 instead of 4.

Alternatively, it is also possible to record each and every instruction related to FOO instead of recording just the branch records. However, such entries will create a large amount of data to be manipulated for creating the profile without adding much value to the accuracy of the profile itself.

Exemplary Summary Table Used for Generating a Performance Profile

Once the branch records associated with the execution of each of the software components are identified then the records may be summarized and ordered according to each software component. FIG. 10 shows the data extracted from the time log 900 of FIG. 9 ordered in the form of a summary table 1000. The various components are listed in column 1010. Using the time stamp column 920 of FIG. 9, the processing times associated with the branch records of each function are added up appropriately to yield the total time spent by a software execution vehicle executing each of the software components at column 1020. This may be translated to a percentage figure in column 1030 to rank each of the components according to the demand each of them are likely to place on the processors. For example, in FIG. 10, function FOO is most likely to dominate a processor's time and thus a good candidate to be moved to a hardware implementation.

Profile of Software Instruction Execution

Figure 11:
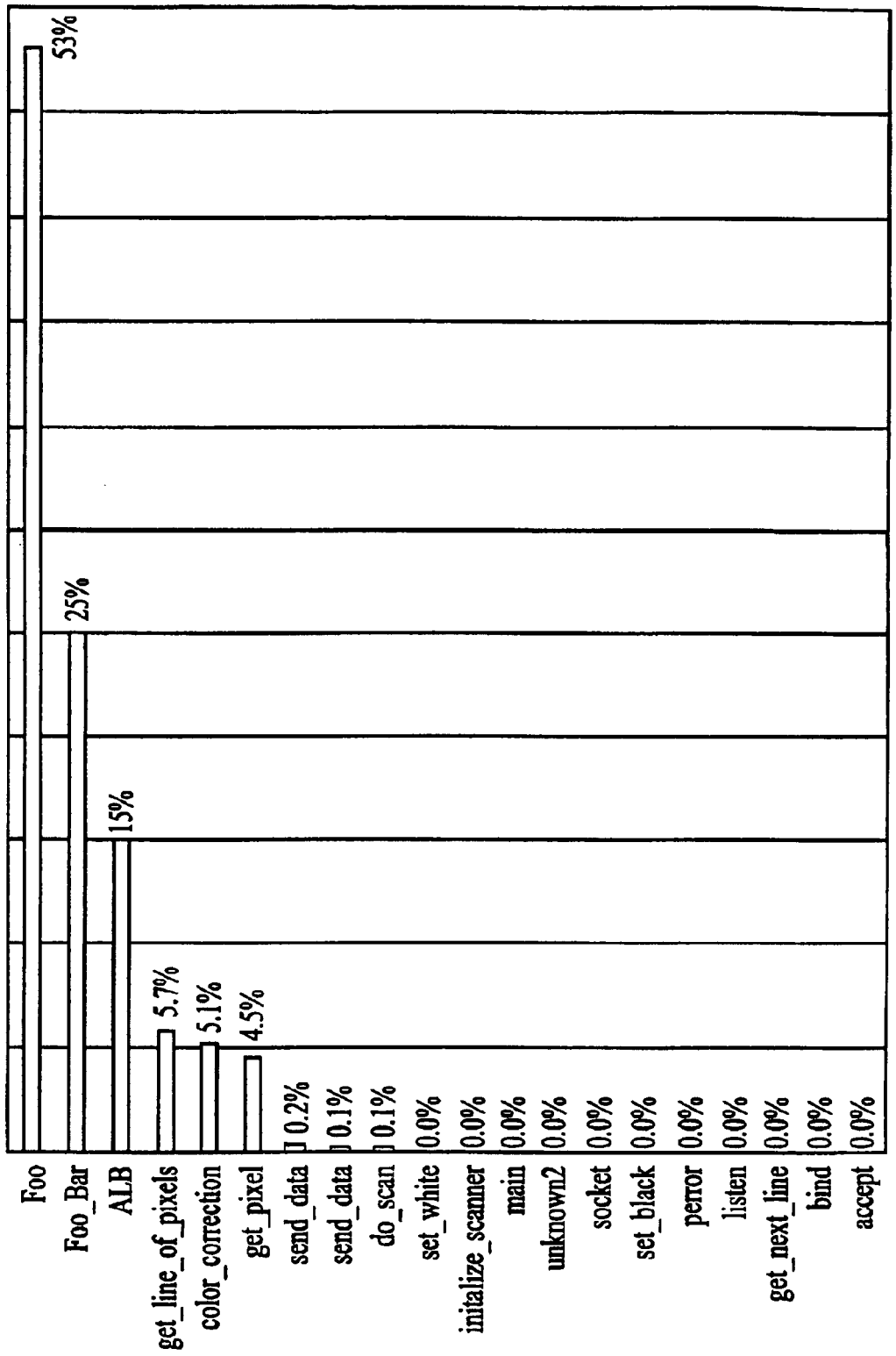
FIG. 11 is an exemplary bar chart corresponding to the summary table of FIG. 10.

FIG. 11 is an illustration of a bar chart that may be used to illustrate the profile data generated using the time log of FIG. 9 and a summary table, such as the one in FIG. 10.

Profile of Memory Transactions

Besides the time data related to execution of software components, other data related to execution of the components may be considered by a designer for deciding whether a particular component should be moved to a hardware implementation. Although it is generally true that moving a system function from software to hardware can increase the processing speed of the particular function, such a change may impact the system as a whole in other aspects. For example, the number of memory and bus transactions may increase as the newly converted hardware component reads and writes data. This could slow down the processing speed of the system as a whole even though the individual function is being executed faster in its hardware implementation. Therefore, it is desirable to analyze the time log 900 of FIG. 9 to identify the memory and bus transactions related to the execution of a software component of the original system. Later, these transactions are compared to the memory and bus transactions related to the repartitioned system to determine whether the system performance as a whole can be improved through repartitioning or not.

Figure 12:
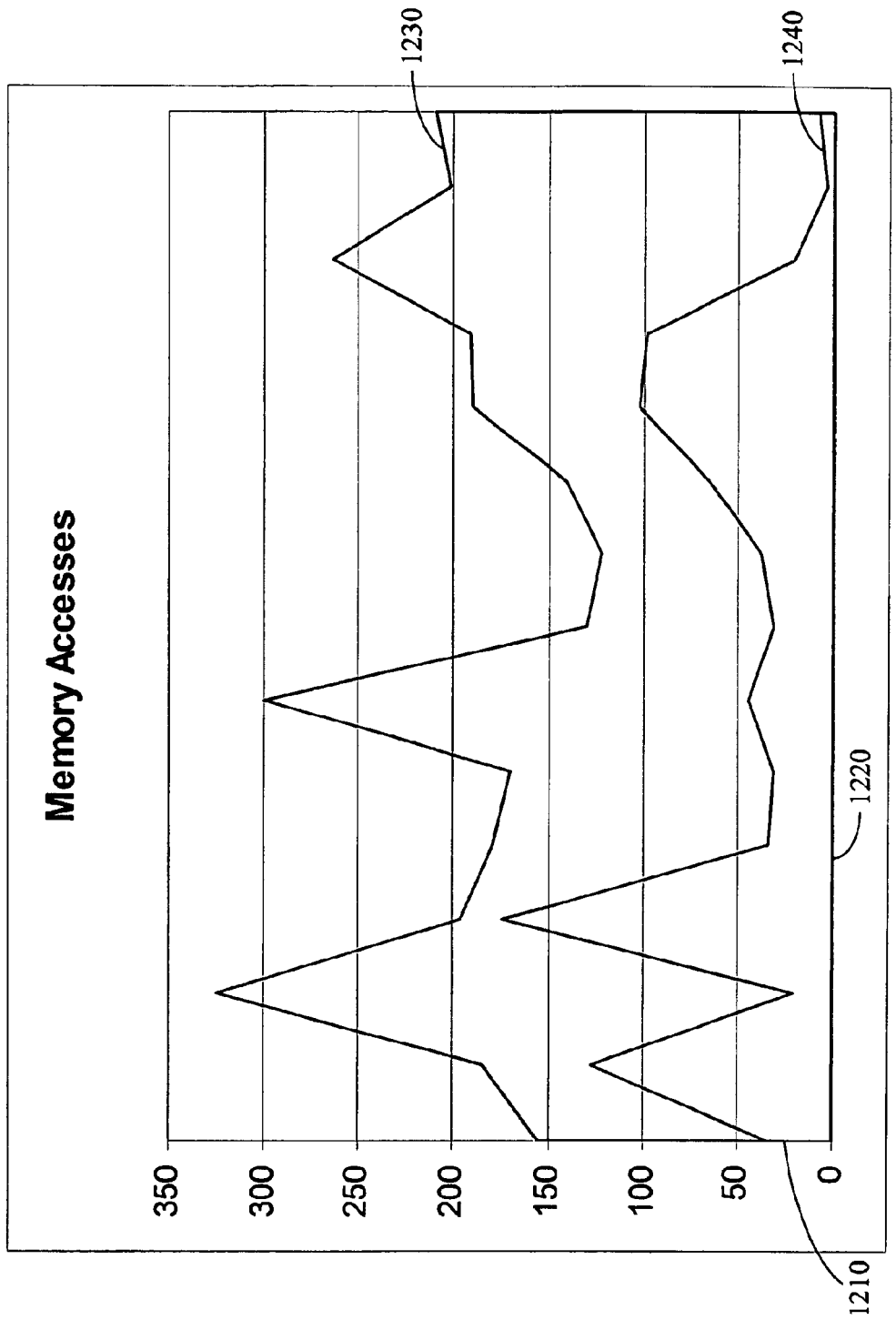
FIG. 12 is a chart profiling the memory transactions related to execution of the software components.

FIG. 12 illustrates a chart profiling the memory transactions related to the execution of the software components prior to repartitioning. The chart shows the number of memory accesses on the y-axis 1210 versus time, which is shown on the x-axis 1220. The access data may also be split between the memory reads at 1230 and the memory writes at 1240. Within the time log 900, the individual memory transactions are matched to their corresponding software component using the time stamp column 920. The memory transaction associated with the execution of a particular function will occur within the same time frame as the execution of the instructions related to the function. In this manner, memory transactions can be profiled not only by totaling all transactions of the system but also by transactions related to each individual function. A similar profile may be a generated for a repartitioned system to compare the impact of repartitioning on the memory transactions. For example, if the function FOO is selected to be moved to hardware and is to be replaced by a modified function FOO' for repartitioning then memory transactions related to FOO may be compared with transactions related to FOO' to determine the impact of repartitioning.

Profile of Bus Transactions

Figure 13:
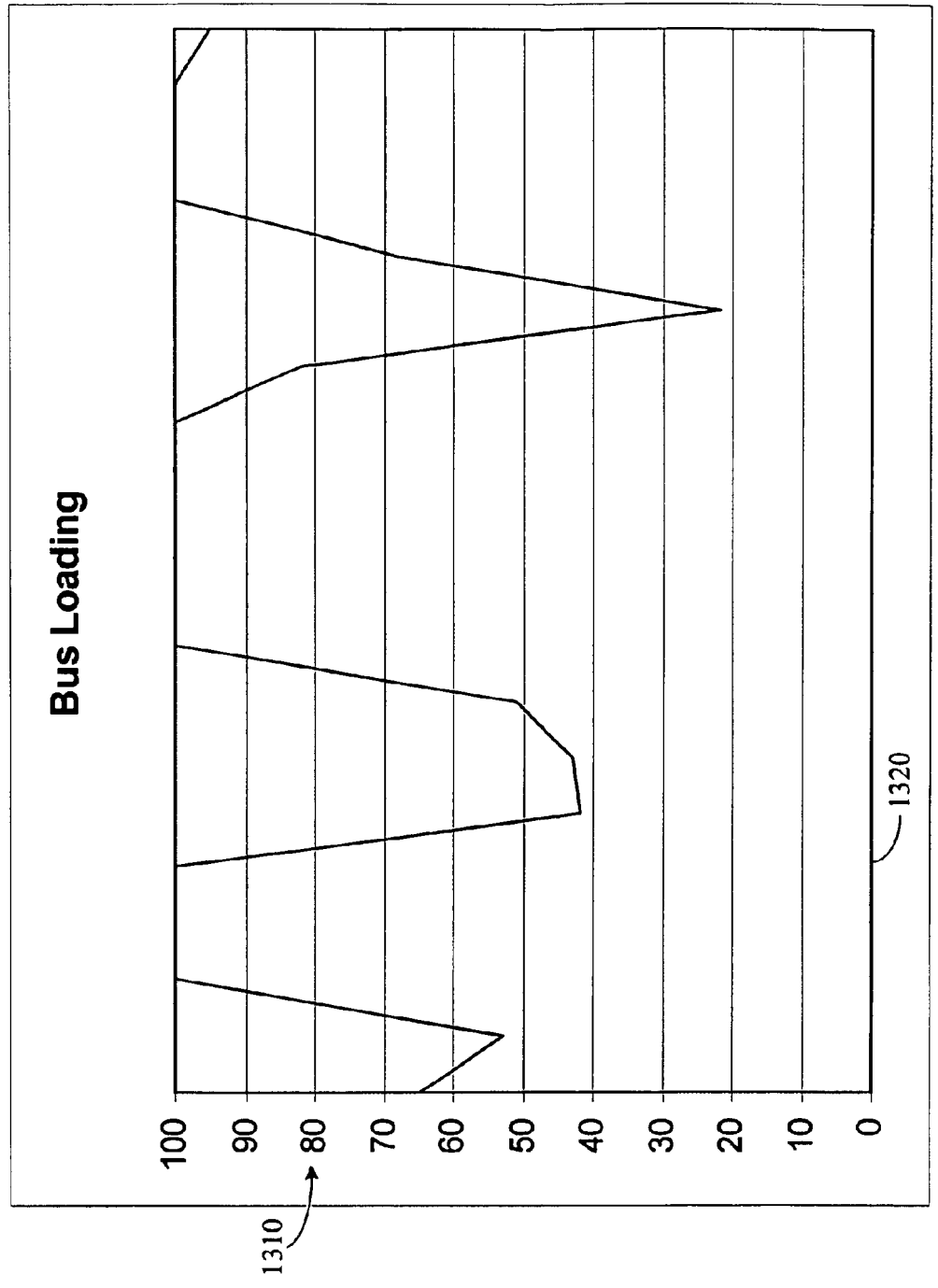
FIG. 13 is a chart profiling the bus transactions related to execution of the software components.

Similar to memory transactions described above, bus transactions before and after repartitioning may be compared to determine whether repartitioning is beneficial or not. FIG. 13 shows bus load data associated with the original system. The time log 900 of FIG. 9 may be used to identity times when a particular system bus was owned by a master and those times it was not owned by any master. This bus load data can be translated to a percentage of bus utilization as shown on y-axis 1310 of FIG. 13 and tracked over time on the x-axis 1320. A similar bus utilization profile can be generated for a repartitioned system to determine whether repartitioning has a positive impact on the system performance. The bus transactions may be matched to the corresponding functions or software components initiating them by matching each bus transaction's address on column 925 to that of the addresses related to the corresponding software component. Tracking the bus transactions may be necessary, because, even if the processing speeds of selected components are increased by moving them to a hardware implementation the bus utilization may be negatively affected thereby slowing down the processing speed of the system as a whole.

Figure 14:
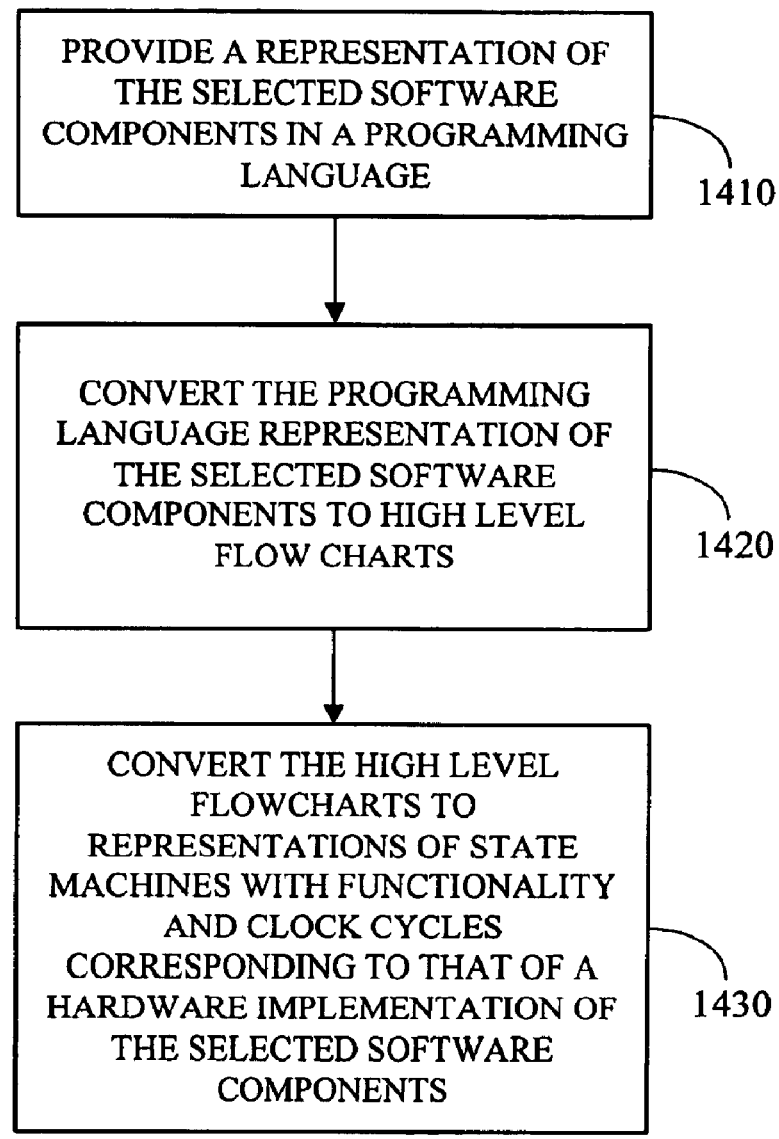
FIG. 14 is a flow chart of an exemplary method for converting a software function described in a programming language into a representation of state machines having functionality and clock cycles corresponding to that of a hardware implementation of the same software function.

Exemplary Method for Generating Hardware Representations of Software Components Selected to be Repartitioned to Hardware Once the performance profile of an original system is generated, it is used (as described above) to select software components to be repartitioned to hardware. According to process 500 for optimizing system performance through repartitioning, a model of the repartitioned system is generated and its performance is measured to verify whether repartitioning benefits system performance. Using models that closely approximate the behavior of an actual repartitioned system yields better estimates of the performance of the repartitioned system. FIG. 14 describes one such method (corresponding to process 530 of FIG. 5) for creating a close approximation of the behavior of the new hardware components of a repartitioned system.

At 1410, the software components selected to be repartitioned to hardware are provided in form of a programming language (e.g. C, C++, JAVA etc.). Then at 1420, the selected components are converted from their programming language representation to high level flow charts that describe the functionality of the components. At 1430, the flow chart representation is used to generate state machines corresponding in functionality to the selected software components. The representation of state machines are adapted so that the number of clock cycles (of a selected processor) required for their execution is similar to that required to execute an actual hardware implementation of the selected components. Thus, a timing accurate model for the new hardware components of the repartitioned system is generated.

At 1410, the description of the software components may also be provided in forms other than a programming language. For example, the software components may already be in form of high level algorithms that are converted to models of the new hardware components of a repartitioned system. The timing accurate models of the new hardware components may be represented in many different forms including programming languages (e.g. C, C++, JAVA etc.) and HDL descriptions. For example, at 1430, a programming language (C) is used to describe state machines with functionality and timing characteristics identical to that of an actual hardware implementation of selected components. However, the same can be accomplished using a HDL description of the hardware components.

Figure 15:
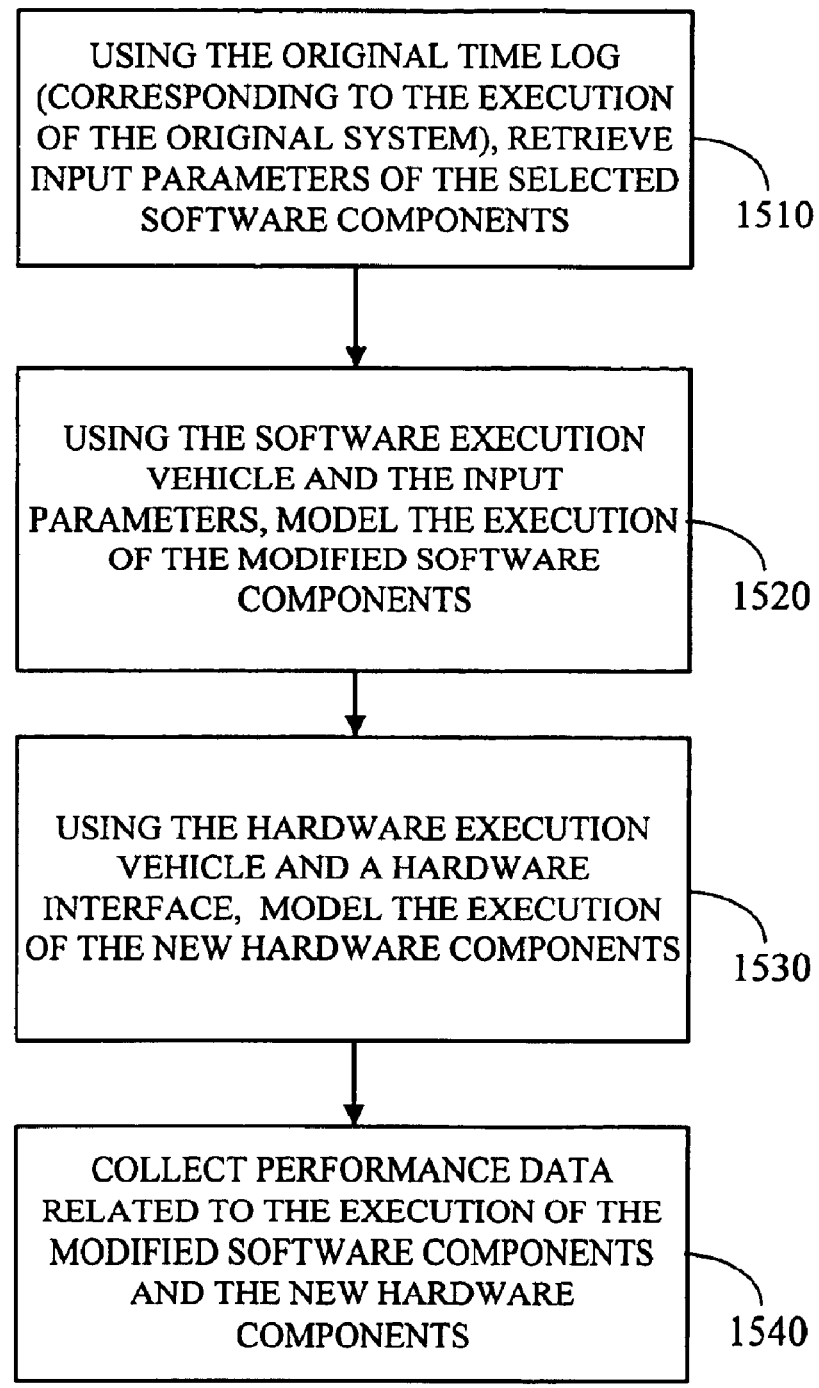
FIG. 15 is a flow chart of an exemplary method for using a software execution vehicle and a hardware execution vehicle for estimating performance data related to the execution of only the newly added components of the repartitioned system.
Figure 17:
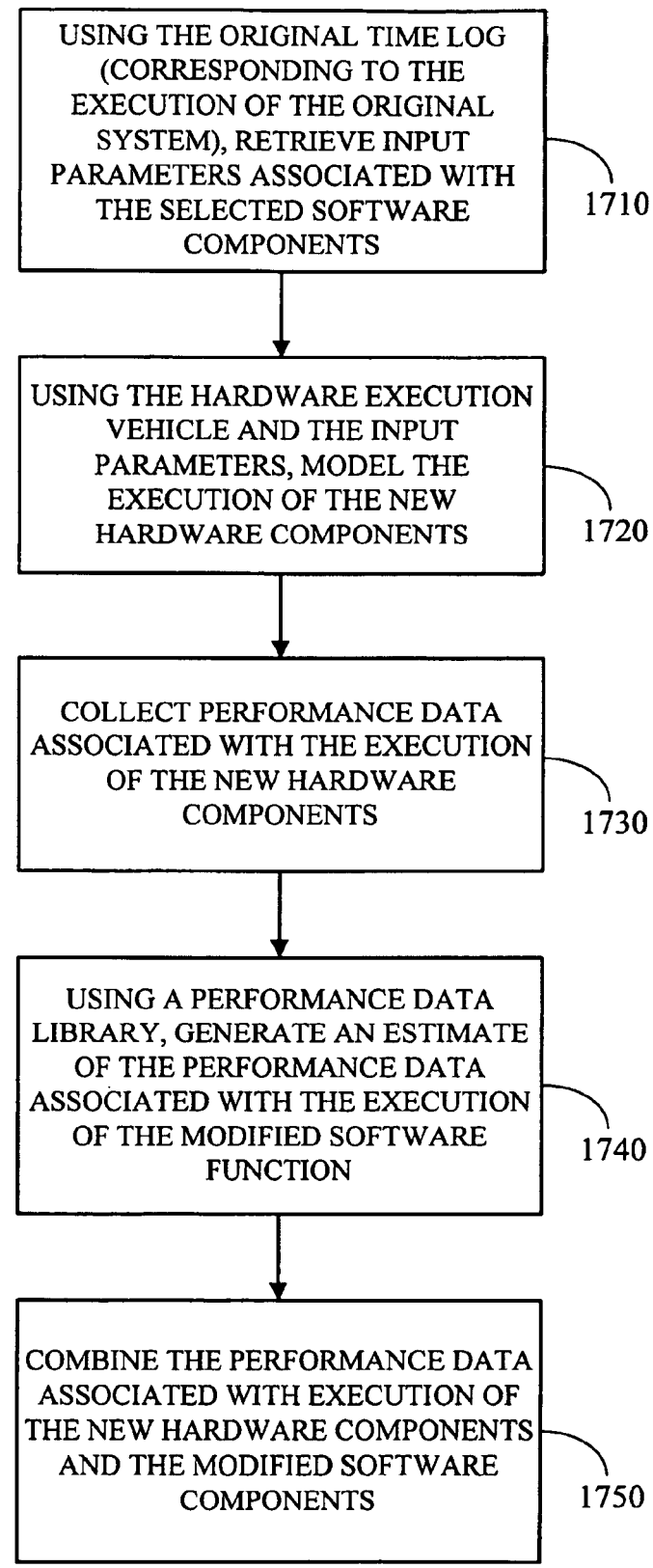
FIG. 17 is a flow chart of an exemplary method for using just the hardware execution vehicle and a performance data library for estimating performance data related to the execution of only the newly added components of the repartitioned system.

Exemplary Method for Estimating Performance Data Related to the Execution of Only the Newly Added Components of the Repartitioned System Once models of the new hardware components and their corresponding modified software components (process 540 of FIG. 5) are generated, all newly added components of a repartitioned system are available for estimating the repartitioned system's performance by collecting the performance data for just these new components. FIGS. 15 and 17 illustrate two different methods for obtaining the performance data of only the newly added components of a repartitioned system. In the method of FIG. 15, both the modified software components and their corresponding new hardware components are executed to obtain their performance data. However, in the alternative method of FIG. 17 only the new hardware components of the repartitioned system are executed for generating performance estimation of the entire repartitioned system. Both these methods yield performance data, which is used to modify the time log of the original system (process 510) to generate an estimated time log of the performance of a repartitioned system.

In FIG. 15, at 1510, the time log associated with the execution of a original system (e.g. the log of FIG. 9) is used to identify and retrieve the input data related to the software components of the original system selected for repartitioning. Then at 1520, the software execution vehicle is used to model the execution of just the modified software components of a repartitioned system. At 1530, the hardware execution vehicle is used to model the execution of the newly added hardware components (corresponding to the software components selected for repartitioning) of a repartitioned system. As described with reference to FIGS. 6 and 7, the hardware execution vehicle and the software execution vehicle may be used separately or simultaneously to model hardware and software execution. At 1540, performance data associated with only the newly added components of a repartitioned system is collected. The collected data is then used to modify the time log associated with the original system to generate an estimate of the performance data of a repartitioned system.

Figure 16:
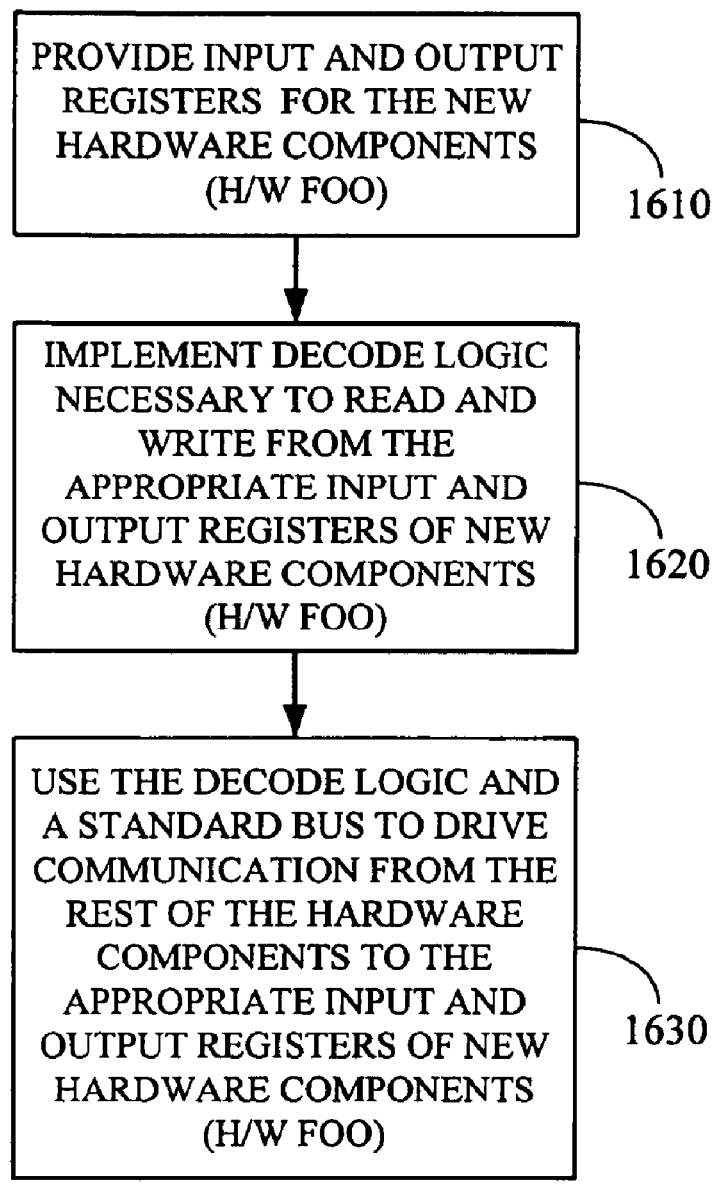
FIG. 16 is a flow chart of an exemplary method for generating a bus interface in hardware for enabling the new hardware components to communicate with the rest of the repartitioned hardware-software system.

Exemplary Method for Creating Hardware Interfaces for the Newly Generated Hardware Component to Communicate with the Rest of the System Once the system is repartitioned, a hardware interface is used in conjunction with the modified software components (FOO') for the proper functioning of the repartitioned system. Such an interface may also be useful for performance estimation of a repartitioned system even prior to its actual repartitioning. FIG. 16 illustrates an exemplary method for generating such a hardware interface or device driver. For example, a hardware interface may be used to enable communication between the modified software component (e.g. FOO') and its corresponding hardware component (hardware FOO). More particularly, the interface is used to pass the input and output data between the two components.

When the representation of new hardware component (e.g. hardware FOO) is generated, it is provided with input and output registers for receiving input data and sending output data at 1610. The input and output registers correspond to input and output data associated with the original software component (software FOO). However, the bus (any standard industry bus e.g. AHB) associated with the newly generated component may not be capable of driving the input data into the appropriate input registers and retrieving the data from the appropriate output registers. Therefore, at 1620, address decode logic is implemented to read from and write to the appropriate registers of the newly generated hardware component. Such decode logic can then be used along with a standard bus to drive the communication of the new hardware component with the rest of the system at 1630. For example, when input data is received from the modified software component, the decode logic may be used to corelate the address associated with the input data to the appropriate input register within the newly generated hardware logic. The same process is repeated for the output data. This enables the rest of the components to communicate with the newly generated hardware component.

Alternative Method for Estimating Performance Data Related to the Execution of Only the Newly Added Components of a Repartitioned System FIG. 17 illustrates a method for obtaining performance data of the newly added components of a repartitioned system without executing the modified software components of such a system. At 1710, the time log associated with an original system (e.g. log of FIG. 9) is used to retrieve input parameters associated with the original software components selected to be repartitioned. Using the original input data, at 1720, a hardware execution vehicle is used to model execution of just the newly added hardware components of the repartitioned system. Then at 1730, performance data associated with the newly added hardware components processing the original input data is collected.

In contrast to the method of FIG. 15, the method FIG. 17 does not create and execute modified software components each time different software components are selected to be repartitioned to hardware for creating different versions of the repartitioned system. Regardless of the differences in the software components being repartitioned, their corresponding modified software components are very similar to each other. Thus, there is little need to generate and execute each instance of the modified software components (there can be many because, typically, multiple components are selected for repartitioning) for the purpose of collecting data to be used in estimating the performance of a repartitioned system. However, once it is confirmed that repartitioning particular software components to hardware is desirable then their corresponding modified software components are generated for proper functioning of the repartitioned system.

Instead of executing each different instance of a modified software component, an exemplary modified software component is first executed using a software execution vehicle (such as the one shown in FIG. 6). Performance data associated with such an exemplary execution is collected and stored in a database or a library, which is used at 1740 to assemble an estimate of the performance data associated with executing a particular instance of the modified software components. At 1750, the data related to modified software components and their corresponding new hardware components are used together to generate an estimate of the performance of the entire repartitioned system. This process provides considerable savings in time and cost for designers interested in verifying whether moving particular software components to hardware can yield desired system performance prior to actually repartitioning the system.

Different instances of modified software components may differ from each other. Modified software components are adapted to function with a corresponding hardware bus interface to enable communication between the newly added hardware components of a repartitioned system with the rest of the components of a system. For example, the modified components (software FOO') may be adapted to pass input parameters to their corresponding hardware component (hardware FOO), wait until the hardware component processes the input parameters, and retrieve the output data. Thus, the performance data related to execution of each instance of modified software function may differ from other instances due to differences in the number of input parameters provided to the new hardware component and the number of output parameters retrieved. However, the activity associated with providing each input parameter is the same regardless of its value or other attributes. The same is true for output parameters. Thus, the performance data for a modified software component adapted to provide and receive multiple inputs and outputs may be assembled by using the performance data associated with providing a single input parameter and retrieving a single output parameter. The performance data library is adapted to store such data. Factors besides the number of input and output parameters are also accounted for during this process.

The process of using a library for assembling an estimate of the performance data associated with a particular instance of the modified software component is described in more detail below with reference FIGS. 19A and 19B.

Figure 18:
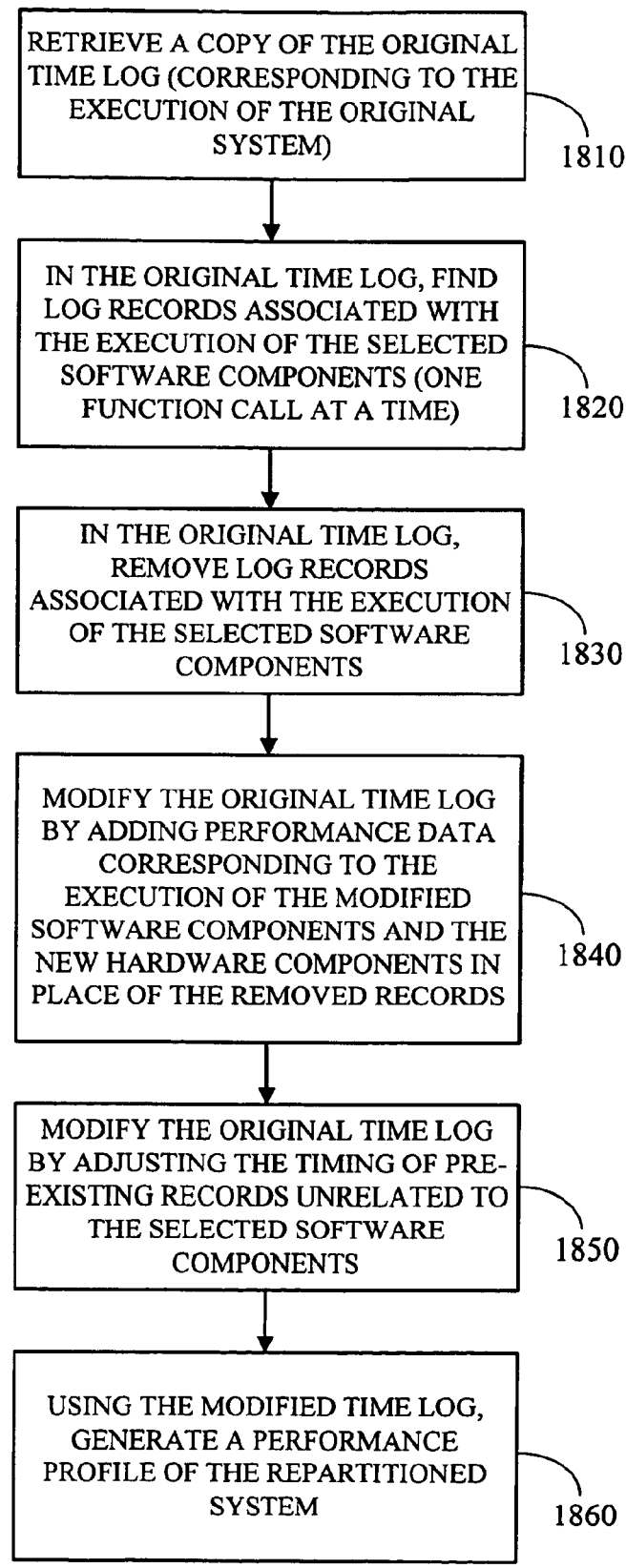
FIG. 18 is a flow chart of an exemplary method for generating an estimate of the performance data related to the entire repartitioned system by using performance data of only the newly added components (obtained using the methods of FIG. 15 or FIG. 17) to modify the time log of the original system.

Exemplary Method for Generating an Estimate of the Performance Data Related to the Entire Repartitioned System Once the performance data of newly added components of a repartitioned system are obtained (e.g. by methods of FIG. 15 or FIG. 17), the data is used to modify the time log of the original system to generate an estimate of the performance data of the entire repartitioned system. FIG. 18 describes a method for generating such a performance estimate. At 1810, a copy of the time log of the original system (e.g. the log of FIG. 9) is obtained. At 1820, log records associated with the execution of the software components selected to be repartitioned (e.g FOO) are identified by using the symbol table to correlate the addresses in FIG. 9 (columns 925 and 930) to addresses related to the selected components. Then at 1830, these log records related to the components selected for repartitioning are removed and at 1840, the performance data related to just the newly added components (e.g. FOO' and hardware FOO) of the repartitioned system are added in place of the removed records. This results in an estimate of a time log related to the performance of a repartitioned system. This estimate is generated without the need to actually repartition the system or even to model the execution of the entire repartitioned system.

Furthermore at 1850, it may be desirable to adjust timing of records that are unchanged during repartitioning. Such adjustments may depend on the nature of the records and requirements of a particular system design. At 1860, the modified time log for estimating the performance of a repartitioned system is used to generate a complete profile of repartitioned system. The methods discussed with reference to generating the profile of an original system are used to create a profile of the repartitioned system as well. The profile of the repartitioned system can then be compared to the profile of the original system to verify whether repartitioning improves system performance.

The process of FIG. 18 is repeated for each call to the software component selected to be repartitioned. The process is repeated on a call-by-call basis to ensure that the proper time order of the various activities in the log is not disturbed. Thus, the timing adjustment of 1850 for subsequent calls to the function will be cumulative of the timing adjustments made for previous calls to the function.

Exemplary Estimated Time Log Corresponding to the Execution of the Repartitioned Hardware-software System According to the process of FIG. 18, an estimated time log of the performance of a repartitioned system is generated by replacing records associated with the components selected for repartitioning with their corresponding newly added components of the repartitioned system. For example, in the original time log 900 of FIG. 9, the performance records 965 and 950 (related to execution of function FOO) are removed according to process 1830 of FIG. 18. Records related to newly added components (e.g. FOO' and hardware FOO) are put in place of such removed records. FIGS. 19A and 19B illustrate an exemplary estimated time log of a repartitioned system generated by such a process (for repartitioning the function FOO). The log is annotated with comments in appropriate places and many of the intermediate log entries have been removed to simplify the log. Thus, the log is only an illustration and not an exact replica of an actual time log. Furthermore, the log of FIGS. 19A and 19B illustrate repartitioning a single software component. However, the methods described below may be used to repartition multiple components.

In the original time log 900 of FIG. 9, the record 970 is shown as the last record prior to records 965 and 950 related to the function FOO. The record 970 is unchanged in the estimated log of the repartitioned system shown in FIG. 19A. All records prior to 970 that are also not related to function FOO remain unchanged in the estimated time log of the repartitioned system. Thus, replacement of the original records related to software FOO begins below the record 970 in FIG. 19A. The records 1910, 1915, 1920, 1925, and 1930 of FIG. 19A and records 1935, 1940, 1945, and 1950 of FIG. 19B are all related to execution of the modified software component (FOO') and the corresponding hardware component (hardware FOO). These records may be obtained by executing just the newly added components of a repartitioned system (as described with reference to FIG's 15). In that event, these new records are used to replace their corresponding records in the original time log to generate an estimated time log of the repartitioned system.

Alternatively, the records may be obtained by using a performance data library (as described with reference to FIG. 17). According to the method of FIG. 17, the records above may have to be assembled by using the contents of such a library. For example, the records 1920 are related to activity associated with passing a single input parameter by FOO' to the hardware component FOO. Thus, the function FOO seems to have a single input parameter. For other functions with multiple input parameters, multiple sets of records 1920 may have to be added from the library to account for the multiple input parameters. The same process may be repeated for the records 1940 of FIG. 19B related to the output parameters.

The records 1930 of FIG. 19A are adapted to generate a wait loop within the function FOO' till the new hardware component (hardware FOO) completes processing the input and returns the output. The example modified software component shown in FIGS. 19A and 19B is adapted to generate such a wait loop for a defined period (e.g. 45 clock cycles). If the processing time of the hardware component is longer than this predetermined wait period, the records 1930 may be added multiple times to account for the processing times of the new hardware component FOO. For example, if the processing time of the hardware component FOO was 32 clock cycles then only one set of records 1930 will be added from the library (because 32 clock cycles is less than the predetermined wait period of 45 clock cycles). If the processing time was 64 clock cycles instead then two sets of records 1930 will be added. The clock cycles required for the processing input parameters by the hardware component FOO is measured by providing a timing accurate representation of the hardware component (as described with reference to FIG. 14) with input parameters for processing and measuring the time taken for processing.

Other records (e.g. 1910, 1915, and 1925 of FIG. 19A and records 1935, 1945 and 1950 of FIG. 19B) associated with executing newly added components of a repartitioned system may be generated only once for each call to the particular component. Such records will be added just once to assemble the performance data by using the library.

Furthermore, records below 1955 in FIG. 19B that are not related to the function FOO may be modified by adjusting their timing. The nature of the adjustment may depend on the processing times measured or estimated for the new components. If the new components (e.g. FOO' and hardware FOO) have a processing time that is less than the original components (e.g. software FOO), the rest of the records outside of FOO may be adjusted by the difference in such processing times.

Use of a Client-Server Network

Figure 20:
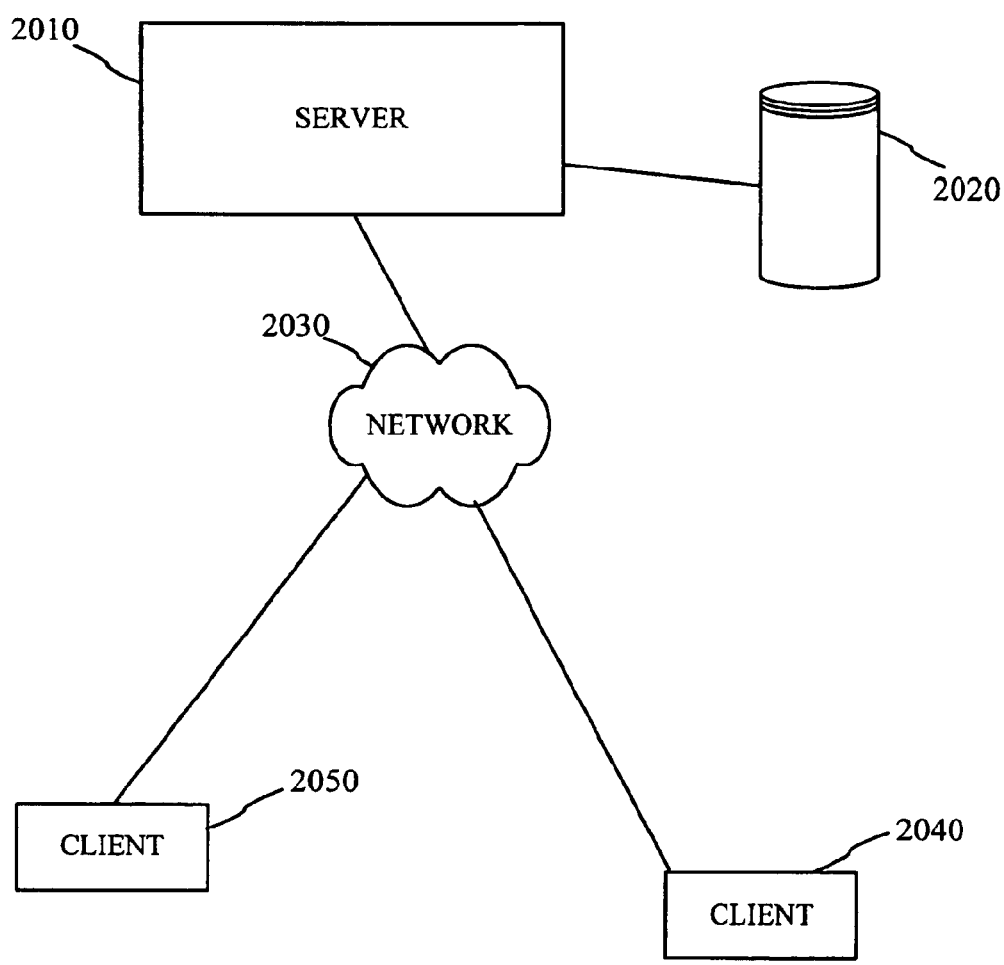
FIG. 20 is a diagram illustrating an exemplary client-server network environment.

Any of the aspects of the method described above may be performed in a distributed computer network. FIG. 20 shows an exemplary network. A server computer 2010 may have an associated database 2020 (internal or external to the server computer). The server computer 2010 may be configured to perform any of the methods associated with the above embodiments. The server computer 2010 may be coupled to a network, shown generally at 2030. One or more client computers, such as those shown at 2040, 2050, may be coupled to the network 2030 and interface with the server computer 2010 using a network protocol.

Figure 21:
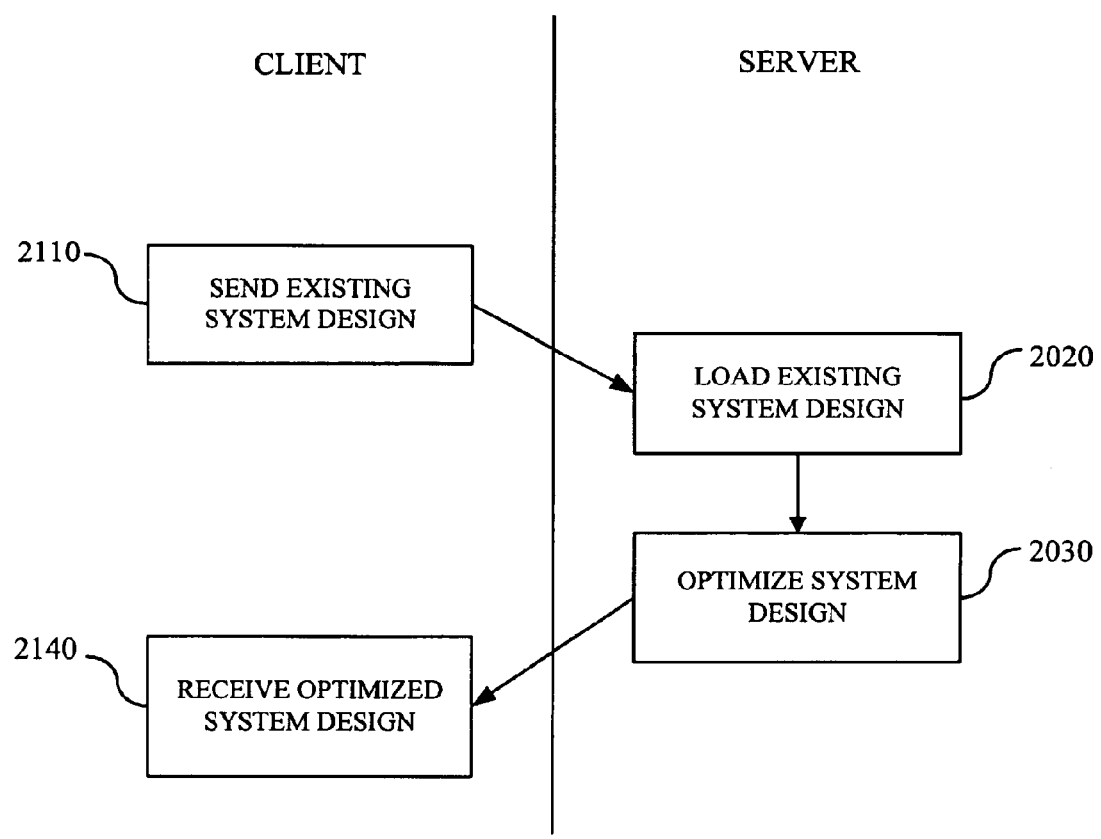
FIG. 21 is a diagram illustrating an exemplary method of optimizing a hardware-software system design using a client-server network, such as the one illustrated in FIG. 20.

FIG. 21 shows that a hardware-software system design may be optimized according to the disclosed method using a remote server computer, such as a server computer 2010 in FIG. 20. In process block 2110, the client computer sends data relating to the existing design of a hardware-software system for which an optimal design is to be calculated. In process block 2120, the data is received and loaded by the server computer. In process block 2130, the method disclosed above is performed and an optimal system design is calculated and selected. In process block 2140, the client computer receives the optimal system design sent by the server computer.

Alternatives

Having illustrated and described the principles of the illustrated embodiments, it will be apparent to those skilled in the art that the embodiments can be modified in arrangement and detail without departing from such principles. Although, the methods and systems have been described above with reference to "repartitioning" a system initially having both software and hardware components for implementing its functionality, these methods are equally applicable for "partitioning" a system whose functionality is initially implemented entirely in software. Furthermore, the methods and systems above have been described above primarily with reference to a system bus connecting the various components of the system (e.g. FIG. 1, FIG. 3, and FIG. 7). However, other means of communication (e.g. a point-to-point connection, a network of buses etc.) are equally effective for practicing the methods and system described above.

In view of the many possible embodiments, it will be recognized that the illustrated embodiments include only examples and should not be taken as a limitation on the scope of the invention. Rather, the invention is defined by the following claims. We therefore claim as the invention all such embodiments that come within the scope of these claims.

We claim:

1. A method for estimating performance of a repartitioned form of an electronic system, the method comprising:

simulating execution of an original form of the electronic system to collect performance data for generating a performance profile of the original form of the electronic system;

obtaining performance data of newly added components of the repartitioned form of the electronic system, wherein the performance data of the newly added components is generated by simulating execution of the newly added components of the repartitioned form of the electronic system; and generating an estimated performance profile of the repartitioned form of the electronic system by using the performance data of the newly added components to modify the performance profile of the original form of the electronic system together with reusing at least a portion of the performance data used to generate the performance profile of the original form of the electronic system.

2. The method of claim 1, wherein the newly added components of the repartitioned form of the electronic system comprise a new hardware component and a modified software component adapted to function together to achieve a predetermined function of a software component of the original form of the electronic system selected to be repartitioned to hardware.

3. The method of claim 2, wherein obtaining the performance data of the newly added components of the repartitioned form of the electronic system comprises:

using a hardware execution vehicle to collect performance data related to the new hardware component; and using a performance data library to obtain performance data related to the modified software component stored therein based on a simulation of execution of the modified software component.

4. The method of claim 3, further comprising adapting performance data from the performance data library according to one or more of the following:

number of input parameters associated with the modified software component;

number of output parameters associated with the modified software component; and processing time of the new hardware component.

5. The method of claim 1, wherein the performance data of the newly added components of the repartitioned form of the electronic system is obtained by using a hardware execution vehicle and a software execution vehicle.

6. The method of claim 1, wherein generating the estimated performance profile of the repartitioned form of the system comprises using the performance data of the newly added components of the repartitioned form of the system to modify the performance profile of the original form of the system.

7. A method for estimating performance of a repartitioned form of a system, comprising:

generating a performance profile of an original form of the system;

obtaining performance data of newly added components of the repartitioned form of the system; and generating an estimated performance profile of the repartitioned form of the system by using the performance data of the newly added components and the performance profile of the original form of the system, wherein generating the estimated performance profile of the repartitioned form of the system comprises:

identifying, in the performance profile of the original form of the system, performance data related to execution of a software component that is selected for repartitioning; and replacing the identified data with the performance data of the newly added components of the repartitioned form of the system.

8. The method of claim 7, wherein identifying the data related to execution of the software component that is selected for repartitioning comprises:

using a symbol table to identify addresses related to execution of the software component selected for repartitioning; and matching the addresses from the symbol table to addresses recorded in the performance profile of the original form of system.

9. The method of claim 7, wherein a time stamp is used to replace the data related to execution of the software component that is selected for repartitioning.

10. The method of claim 7, further comprising adjusting time order of performance data unrelated to the software component that is selected for repartitioning.

11. The method of claim 1, further comprising generating a timing accurate model of a hardware component of the newly added components of the repartitioned form of the electronic system.

12. The method of claim 11, wherein the timing accurate model of the hardware component of the newly added components is generated by converting a representation of a software component selected to be repartitioned to a corresponding representation of state machines having functionality and timing corresponding to that of an hardware implementation of the selected software component.

13. The method of claim 1, wherein generating the performance profile of the original form of the electronic system comprises one or more of the following:

recording time data related to execution of the original form of the electronic system;

recording memory transactions related to the execution of the original form of the electronic system; and recording bus transactions related to the execution of the original form of the electronic system.

14. The method of claim 1, wherein the estimated performance profile of the repartitioned form of the electronic system comprises:

time data related to execution of the repartitioned form of the electronic system;

memory transactions related to the execution of the repartitioned form of the electronic system; and bus transactions related to the execution of the repartitioned form of the electronic system.

15. The method of claim 1, wherein the performance profile of the original form of the electronic system is used to select software components of the original form of the electronic system to be moved to hardware in the repartitioned form of the electronic system.

16. The method of claim 1, further comprising generating a hardware interface for enabling communication between the newly added components of the repartitioned form of the electronic system.

17. A tool for estimating performance of a hardware-software system comprising:

a hardware execution vehicle;

a performance data library; and one or more processors coupled to the hardware execution vehicle and the performance data library, the one or more processors programmed to use the hardware execution vehicle and the performance data library to modify a performance profile of an original form of the system to generate an estimated performance profile of a repartitioned form of the system.

18. The tool of claim 17, wherein the hardware execution vehicle is adapted to model the execution of a newly generated hardware component of the repartitioned form of the system.

19. The tool of claim 17, wherein the performance data library comprises performance data related to execution of a model modified software component of a model repartitioned system.

20. The tool of claim 17, wherein the one or more processors are adapted to use the performance data library to assemble performance data of a modified software component of the repartitioned form of the system by adjusting performance data in the performance data library according to one or more of the following:
   number of input parameters associated with the modified software component;
   number of output parameters associated with the modified software component; and
   processing time of a new hardware component corresponding to the modified software component.

21. The tool of claim 17, wherein the performance profile of the original form of the system is modified by replacing performance data related to a software component selected to be repartitioned with performance data related to its corresponding new hardware component and its corresponding modified software component in the repartitioned form of the system.

22. The tool of claim 17, further comprising a software execution vehicle adapted to function together with the hardware execution vehicle to model the execution of the original form of the system.

23. The tool of claim 22, wherein the one or more processors are further adapted to collect performance data from the hardware execution vehicle and the software execution vehicle to generate the performance profile of the original form of the system.

24. The tool of claim 17, wherein the hardware execution vehicle comprises one or more of the following:
   logic simulators;
   accelerators;
   in-circuit emulators; and
   FPGAs.

25. A tool for estimating performance of a hardware-software system comprising:
   a hardware execution vehicle;
   a software execution vehicle; and
   one or more processors coupled to the hardware execution vehicle and the software execution vehicle, the one or more processors programmed to use the hardware execution vehicle and the software execution vehicle to modify a performance profile of an original form of the system to generate an estimated performance profile of a repartitioned form of the system.

26. The tool of claim 25, wherein the performance profile of the original form of the system is modified by replacing performance data related to a software component selected to be repartitioned with performance data related to its corresponding new hardware component and its corresponding modified software component in the repartitioned form of the system.

27. The tool of claim 25, wherein the hardware execution vehicle is adapted to model the execution of a new hardware component of the repartitioned from of the system which corresponds to a software component selected to be repartitioned from the original form of the system.

28. The tool of claim 25, wherein the software execution vehicle is adapted to model the execution of a modified software component of the repartitioned from of the system which corresponds to a software component selected to be repartitioned from the original form of the system.

29. The tool of claim 25, wherein the one or more processors are further adapted to use the hardware execution vehicle and the software execution vehicle to generate the performance profile of the original form of the system.

30. A method for optimizing performance of a system comprising:
   generating a performance profile for an original form of the system;
   selecting a software component having a predetermined function;
   generating a model of a new hardware component adapted to interact with a corresponding modified software component so that the modified software component and the new hardware component together achieve the predetermined function of the selected software component;
   obtaining performance data related to a simulated execution of the generated model of the new hardware component and a simulated execution of the modified software component;
   using the obtained performance data to modify a performance profile of an original form of the system to generate an estimated performance profile of a repartitioned form of the system; and
   comparing the estimated performance profile of the repartitioned form of the system to the performance profile of the original form of the system to verify improvements in system performance.

31. The method of claim 30, wherein a hardware execution vehicle is used for obtaining the performance data related to the simulated execution of the generated model of the new hardware component and a performance data library is used for obtaining the performance data related to the simulated execution of the modified software component.

32. The method of claim 31, wherein the performance data library comprises performance data related to the simulated execution of a model modified software component of a model repartitioned system.

33. The method of claim 31, wherein the performance data obtained from the performance data library is adapted according to one or more of the following:
   number of input parameters associated with the modified software component;
   number of output parameters associated with the modified software component; and
   processing time of the generated model of the new hardware component corresponding to the modified software component.

34. The method of claim 30, wherein a hardware execution vehicle is used for obtaining the performance data related to the simulated execution of the generated model of the new hardware component and a software execution vehicle is used for obtaining the performance data related to the simulated execution of the modified software component.

35. The method of claim 30, wherein the estimated performance profile of the repartitioned form of the system is generated by replacing performance data related to the selected software component in the performance profile of the original form of the system with the performance data related to the simulated execution of the generated new hardware component and the simulated execution of the modified software component of the repartitioned form of the system.

36. The method of claim 30, wherein the estimated performance profile of the repartitioned form of the system comprises one or more of the following:

time data related to execution of the repartitioned form of the system;

memory transactions related to the execution of the repartitioned form of the system; and bus transactions related to the execution of the repartitioned form of the system.

* * * * *

UNITED STATES PATENT AND TRADEMARK OFFICE
CERTIFICATE OF CORRECTION

PATENT NO. : 6,856,951 B2  Page 1 of 1
APPLICATION NO. : 10/295193
DATED : February 15, 2005
INVENTOR(S) : Moona et al.

It is certified that error appears in the above-identified patent and that said Letters Patent is hereby corrected as shown below:

Col. 21 lines 41-46
Claim 6. Should be cancelled as per Amendment with certificate of mailing of 9/8/2004.

Col. 23 Line 60 of this claim, please remove "repartitioned from" and replace with --repartitioned form--.

Col. 23 Line 65 of this claim, please remove "repartitioned from" and replace with --repartitioned form--.

Signed and Sealed this

Twenty-fifth Day of December, 2007

JON W. DUDAS
*Director of the United States Patent and Trademark Office*